(12) United States Patent
Kanai

(10) Patent No.: US 8,654,140 B2
(45) Date of Patent: *Feb. 18, 2014

(54) IMAGE PROCESSOR, IMAGE DISPLAY DEVICE, AND IMAGE PROCESSING METHOD

(75) Inventor: Masashi Kanai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 465 days.

This patent is subject to a terminal disclaimer.

(21) Appl. No.: 12/641,938

(22) Filed: Dec. 18, 2009

(65) Prior Publication Data

US 2010/0165193 A1    Jul. 1, 2010

(30) Foreign Application Priority Data

Dec. 26, 2008  (JP) .................. 2008-332969
Jan. 26, 2009  (JP) .................. 2009-013871

(51) Int. Cl.
G09G 5/02 (2006.01)
H04N 9/66 (2006.01)
H04N 9/73 (2006.01)
G06K 9/00 (2006.01)
G06K 9/40 (2006.01)

(52) U.S. Cl.
USPC ........... 345/589; 348/638; 348/658; 382/162; 382/167; 382/274

(58) Field of Classification Search
None
See application file for complete search history.

(56) References Cited

U.S. PATENT DOCUMENTS

| 6,701,024 | B1 * | 3/2004 | Sasai ..................... 382/260 |
| 6,791,565 | B2 | 9/2004 | Kanai |
| 6,894,697 | B2 * | 5/2005 | Matsuda ................. 345/589 |
| 7,418,129 | B2 | 8/2008 | Komori |
| 7,486,304 | B2 * | 2/2009 | Bergquist et al. ........ 345/690 |
| 7,545,397 | B2 | 6/2009 | O'Dea et al. |
| 7,551,334 | B2 * | 6/2009 | Li ........................... 358/518 |
| 7,710,474 | B2 * | 5/2010 | Hatano ..................... 348/252 |
| 7,903,148 | B2 | 3/2011 | Yokoyama et al. |
| 8,050,515 | B2 * | 11/2011 | Chen ........................ 382/274 |
| 2003/0020725 | A1 * | 1/2003 | Matsuda .................. 345/600 |
| 2005/0141778 | A1 | 6/2005 | Nakajima et al. |
| 2006/0256217 | A1 | 11/2006 | Hatano |

(Continued)

FOREIGN PATENT DOCUMENTS

EP  1 345 172 A1  9/2003
JP  A-2002-077667  3/2002

(Continued)

OTHER PUBLICATIONS

U.S. Appl. No. 12/603,200, filed Oct. 21. 2009, now U.S. Patent No. 8,452,121 B2.

(Continued)

Primary Examiner — Kee M Tung
Assistant Examiner — Haixia Du
(74) Attorney, Agent, or Firm — Oliff PLC

(57) ABSTRACT

An image processor that corrects an image signal supplied to an image display section, includes: a luminance component correction amount calculating section that calculates the amount of correction of a luminance component of the image signal according to visual environment only for an image signal in a predetermined luminance level range in a predetermined spatial frequency band; and a luminance component correcting section that corrects the luminance component of the image signal using the amount of correction calculated by the luminance component correction amount calculating section.

14 Claims, 30 Drawing Sheets

(56) References Cited

U.S. PATENT DOCUMENTS

| | | |
|---|---|---|
| 2007/0080975 A1 | 4/2007 | Yamashita et al. |
| 2007/0109317 A1 | 5/2007 | Minakuchi et al. |
| 2007/0109447 A1* | 5/2007 | Yamashita et al. ............ 348/602 |
| 2007/0177030 A1 | 8/2007 | Yokoyama et al. |
| 2010/0060794 A1* | 3/2010 | Kanai ........................... 348/624 |

FOREIGN PATENT DOCUMENTS

| | | |
|---|---|---|
| JP | A-2002-91415 | 3/2002 |
| JP | A-2004-032427 | 1/2004 |
| JP | A-2004-252620 | 9/2004 |
| JP | A-2004-266755 | 9/2004 |
| JP | A-2006-121713 | 5/2006 |
| JP | A-2006-148607 | 6/2006 |
| JP | A-2006-166032 | 6/2006 |
| JP | A-2007-142500 | 6/2007 |
| JP | A-2007-208399 | 8/2007 |
| JP | A-2007-306505 | 11/2007 |
| KR | 2003-0070845 | 9/2003 |

OTHER PUBLICATIONS

U.S. Appl. No. 12/548,981, filed Aug. 27, 2009.
Jan. 20, 2010 European Search Report issued in European Patent Application No. 09169715.1.
Jan. 15, 2013 Office Action issued in U.S. Appl. No. 12/603,200.
Mar. 12, 2013 Notice of Allowance issued in U.S. Appl. No. 12/603,200.
Apr. 11, 2013 Supplemental Notice of Allowability issued in U.S. Appl. No. 12/603,200.
Apr. 24, 2013 Office Action issued in U.S. Appl. No. 12/548,981.
Sep. 26, 2012 Office Action issued in U.S. Appl. No. 12/603,200.

* cited by examiner

| BRIGHTNESS RATIO | CORRECTION INTENSITY |
|---|---|
| Ra | HSa |
| Rb | HSb |
| Rc | HSc |
| ⋮ | ⋮ |

FIG. 5

| FILTER OUTPUT | | | WEIGHT COEFFICIENT | | |
|---|---|---|---|---|---|
| FO1a | FO2a | FO3a | $g_{1a}$ | $g_{2a}$ | $g_{3a}$ |
| FO1a | FO2a | FO3b | $g_{1b}$ | $g_{2b}$ | $g_{3b}$ |
| FO1a | FO2b | FO3c | $g_{1c}$ | $g_{2c}$ | $g_{3c}$ |
| ⋮ | ⋮ | ⋮ | ⋮ | ⋮ | ⋮ |

FIG. 9

| INPUT BRIGHTNESS SIGNAL | BRIGHTNESS GAIN |
|---|---|
| Ya | ha |
| Yb | hb |
| Yc | hc |
| ⋮ | ⋮ |

FIG. 10

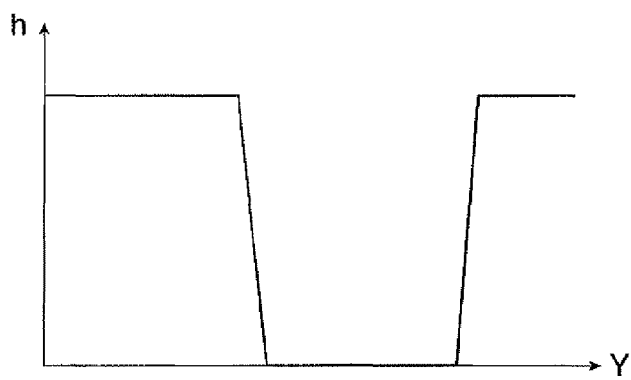
FIG. 11A
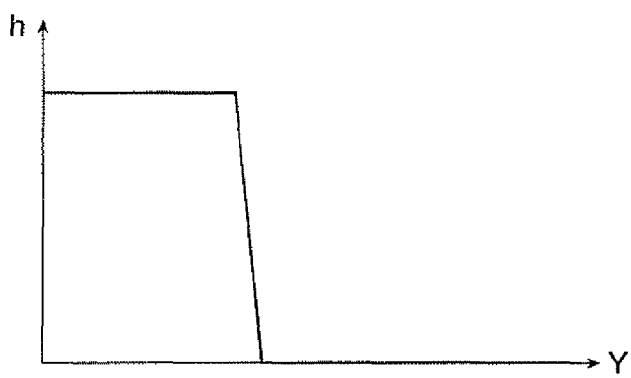
FIG. 11B
FIG. 11
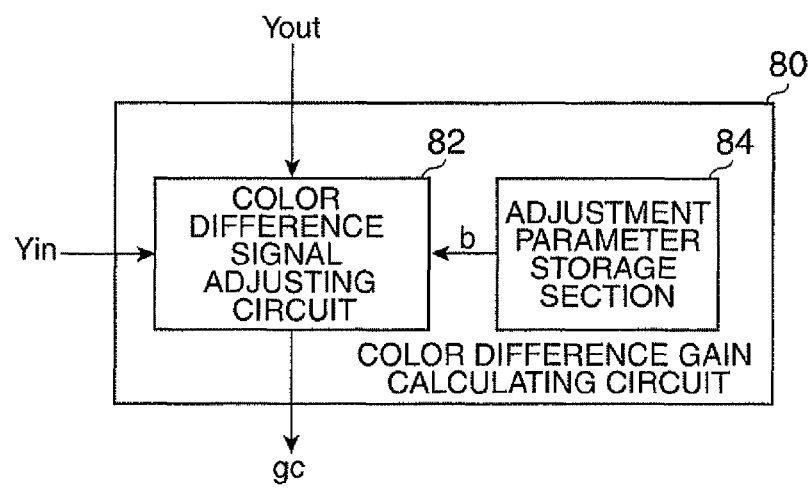
FIG. 12

FIG. 18A

| INPUT BRIGHTNESS SIGNAL | CORRECTION INTENSITY | BRIGHTNESS GAIN |
|---|---|---|
| Ya | HSa | j₁a |
| Ya | HSb | j₁b |
| ⋮ | ⋮ | ⋮ |
| Yb | HSa | j₁c |
| Yb | HSb | j₁d |
| ⋮ | ⋮ | ⋮ |
| Yc | HSc | j₁e |
| ⋮ | ⋮ | ⋮ |

FIG. 18B

| INPUT BRIGHTNESS SIGNAL | CORRECTION INTENSITY | BRIGHTNESS GAIN |
|---|---|---|
| Ya | HSa | j₂a |
| Ya | HSa | j₂b |
| ⋮ | ⋮ | ⋮ |
| Yb | HSb | j₂c |
| Yb | HSb | j₂d |
| ⋮ | ⋮ | ⋮ |
| Yc | HSc | j₂e |
| ⋮ | ⋮ | ⋮ |

FIG. 18C

| INPUT BRIGHTNESS SIGNAL | CORRECTION INTENSITY | BRIGHTNESS GAIN |
|---|---|---|
| Ya | HSa | j₃a |
| Ya | HSa | j₃b |
| ⋮ | ⋮ | ⋮ |
| Yb | HSb | j₃c |
| Yb | HSb | j₃d |
| ⋮ | ⋮ | ⋮ |
| Yc | HSc | j₃e |
| ⋮ | ⋮ | ⋮ |

FIG. 18

| INPUT BRIGHTNESS SIGNAL | CORRECTION INTENSITY | FILTER OUTPUT | | | OUTPUT OF AMOUNT OF CORRECTION |
|---|---|---|---|---|---|
| Ya | HSa | FO1a | FO2a | FO3a | VAa |
| Ya | HSa | FO1a | FO2a | FO3b | VAb |
| ⋮ | ⋮ | ⋮ | ⋮ | ⋮ | ⋮ |
| Ya | HSb | FO1a | FO2a | FO3a | VAc |
| Ya | HSb | FO1a | FO2a | FO3b | VAd |
| ⋮ | ⋮ | ⋮ | ⋮ | ⋮ | ⋮ |
| Yb | HSc | FO1a | FO2b | FO3c | VAe |
| Yb | HSc | FO1a | FO2b | FO3d | VAf |
| ⋮ | ⋮ | ⋮ | ⋮ | ⋮ | ⋮ |

FIG. 20

| OUTPUT OF HPF CIRCUIT | $\alpha$HPF | $\alpha$LPF |
|---|---|---|
| highYa | $\alpha$HPFa | $\alpha$LPFa |
| highYb | $\alpha$HPFb | $\alpha$LPFb |
| highYc | $\alpha$HPFc | $\alpha$LPFc |
| ⋮ | ⋮ | ⋮ |

| OUTPUT OF HPF CIRCUIT | BRIGHTNESS GAIN |
|---|---|
| highYa | fa |
| highYb | fb |
| highYc | fc |
| ⋮ | ⋮ |

| OUTPUT OF HPF CIRCUIT | WEIGHT COEFFICIENT | | |
|---|---|---|---|
| highYa | $g_1a$ | $g_2a$ | $g_3a$ |
| highYb | $g_1b$ | $g_2b$ | $g_3b$ |
| highYc | $g_1c$ | $g_2c$ | $g_3c$ |

FIG. 34A

| INPUT BRIGHTNESS SIGNAL | OUTPUT OF HPF CIRCUIT | CORRECTION INTENSITY | BRIGHTNESS GAIN |
|---|---|---|---|
| Ya | highYa | HSa | j1a |
| Ya | highYa | HSb | j1b |
| ⋮ | ⋮ | ⋮ | ⋮ |
| Ya | highYb | HSa | j1c |
| Ya | highYb | HSb | j1d |
| ⋮ | ⋮ | ⋮ | ⋮ |
| Yb | highYc | HSd | j1e |
| ⋮ | ⋮ | ⋮ | ⋮ |

FIG. 34B

| INPUT BRIGHTNESS SIGNAL | OUTPUT OF HPF CIRCUIT | CORRECTION INTENSITY | BRIGHTNESS GAIN |
|---|---|---|---|
| Ya | highYa | HSa | j2a |
| Ya | highYa | HSb | j2b |
| ⋮ | ⋮ | ⋮ | ⋮ |
| Ya | highYb | HSa | j2c |
| Ya | highYb | HSb | j2d |
| ⋮ | ⋮ | ⋮ | ⋮ |
| Yb | highYc | HSd | j2e |
| ⋮ | ⋮ | ⋮ | ⋮ |

FIG. 34C

| INPUT BRIGHTNESS SIGNAL | OUTPUT OF HPF CIRCUIT | CORRECTION INTENSITY | BRIGHTNESS GAIN |
|---|---|---|---|
| Ya | highYa | HSa | j3a |
| Ya | highYa | HSb | j3b |
| ⋮ | ⋮ | ⋮ | ⋮ |
| Ya | highYb | HSa | j3c |
| Ya | highYb | HSb | j3d |
| ⋮ | ⋮ | ⋮ | ⋮ |
| Yb | highYc | HSd | j3e |
| ⋮ | ⋮ | ⋮ | ⋮ |

FIG. 34

| INPUT BRIGHTNESS SIGNAL | OUTPUT OF HPF CIRCUIT | FILTER OUTPUT | | | CORRECTION INTENSITY | OUTPUT OF AMOUNT OF CORRECTION |
|---|---|---|---|---|---|---|
| Ya | highYa | FO1a | FO2a | FO3a | HSa | VAa |
| Ya | highYa | FO1a | FO2a | FO3a | HSb | VAb |
| ⋮ | ⋮ | ⋮ | ⋮ | ⋮ | ⋮ | ⋮ |
| Ya | highYa | FO1a | FO2a | FO3b | HSa | VAc |
| Ya | highYa | FO1a | FO2a | FO3b | HSb | VAd |
| ⋮ | ⋮ | ⋮ | ⋮ | ⋮ | ⋮ | ⋮ |
| Yb | highYc | FO1a | FO2b | FO3c | HSa | VAe |
| Yb | highYc | FO1a | FO2b | FO3c | HSb | VAf |
| ⋮ | ⋮ | ⋮ | ⋮ | ⋮ | ⋮ | ⋮ |
| Yc | highYd | FO1e | FO2f | FO3g | HSh | VAj |
| ⋮ | ⋮ | ⋮ | ⋮ | ⋮ | ⋮ | ⋮ |

FIG. 36

IMAGE PROCESSOR, IMAGE DISPLAY DEVICE, AND IMAGE PROCESSING METHOD

BACKGROUND

1. Technical Field

The present invention relates to an image processor, an image display device, and an image processing method.

2. Related Art

In recent years, an image display device with a wider color reproduction range is demanded as the quality of a content image becomes higher. However, even in an image display device for which an advanced color reproduction technique is adopted, the color reproduction range becomes narrow due to reflection of light or the like when the image display device is used in a bright environment using light or the like. For example, this frequently leads to an overall lightening of image colors.

Accordingly, for example, JP-A-2002-91415 discloses a technique of measuring the brightness of the environment of use of an image display device with a sensor and performing the processing of highlighting the chroma of an image according to the brightness of the environment of use using the measurement result of the sensor.

JP-A-2002-91415 discloses a technique of measuring the brightness or color of exterior light illuminated to the image display device with the sensor, rewriting a color correction table so that the influence is canceled, and performing color correction on an image signal according to the rewritten color correction table.

In the technique disclosed in JP-A-2002-91415, however, the correction is uniformly performed on the whole screen. Accordingly, there is a problem that an image is expressed under conditions in which the detail of the image is spoiled, even though the contrast of luminosity or chroma of an image can be improved.

SUMMARY

An advantage of some aspects of the invention is that it provides an image processor, an image display device, and an image processing method capable of improving the expression of the detail of an image regardless of the environment of use.

According to an aspect of the invention, an image processor that corrects an image signal supplied to an image display section includes: a luminance component correction amount calculating section that calculates the amount of correction of a luminance component of the image signal according to visual environment only for an image signal in a predetermined luminance level range in a predetermined spatial frequency band; and a luminance component correcting section that corrects the luminance component of the image signal using the amount of correction calculated by the luminance component correction amount calculating section.

According to the aspect of the invention, the luminance component of the image signal is corrected only for the image signal in the predetermined luminance level range in the predetermined spatial frequency band. Accordingly, even in the case where dark and bright portions are mixed, the image signal can be corrected such that the details of both the dark and bright portions can be expressed without uniformly correcting the whole screen. In addition, since the amount of correction of the luminance component is calculated according to the visual environment, it becomes possible to provide the image processor capable of improving the expression of the detail of an image regardless of the environment of use.

In the image processor according to the aspect of the invention, the luminance component correction amount calculating section may calculate the amount of correction using a luminance ratio of outside light and output light of the image display section as the visual environment.

According to the aspect of the invention, since the luminance ratio of the outside light and the output light of the image display section is adopted as the visual environment, it becomes possible to provide the image processor capable of improving the expression of the detail of an image regardless of the environment of use with a simple configuration.

Moreover, the image processor according to the aspect of the invention may further include a signal extracting circuit that extracts a signal in the spatial frequency band from the luminance component of the image signal. The luminance component correction amount calculating section may include a luminance gain calculating circuit, which calculates the luminance gain corresponding to a level of the luminance component of the image signal, and calculate the amount of correction of the luminance component on the basis of the signal in the spatial frequency band extracted by the signal extracting circuit, the luminance gain calculated by the luminance gain calculating circuit, and the luminance ratio.

According to the aspect of the invention, the signal in the predetermined spatial frequency band can be extracted by the signal extracting circuit, and the signal in the level range in the predetermined luminance component can be specified by the luminance gain calculating circuit. As a result, in addition to the above-described effect, the luminance component of the image signal can be corrected only for the image signal in the predetermined luminance level range in the predetermined spatial frequency band with the simple configuration.

Moreover, the image processor according to the aspect of the invention may further include a multi-stage filter circuit that extracts a signal in the spatial frequency band from the luminance component of the image signal. The luminance component correction amount calculating section may include a plurality of tables which is provided for every output of the multi-stage filter circuit and outputs a gain corresponding to the luminance ratio and the level of the luminance component before correction, a plurality of multipliers which is provided for every output of the multi-stage filter circuit and performs multiplication of the output of the multi-stage filter circuit and the output of each of the plurality of tables, and an adder which adds the multiplication results of the plurality of multipliers and may calculate an output of the adder as the amount of correction of the luminance component.

According to the aspect of the invention, when correcting the luminance component of the image signal only for the image signal in the predetermined luminance level range in the predetermined spatial frequency band, the gain is output from the plurality of tables provided for every output of the multi-stage filter circuit. As a result, in addition to the above-described effect, it becomes possible to reduce power consumption and cost since the number of multipliers can be reduced.

Moreover, the image processor according to the aspect of the invention may further include a signal extracting circuit that extracts a signal in the spatial frequency band from the luminance component of the image signal. The luminance component correction amount calculating section may include a table which outputs the amount of correction of the luminance component corresponding to an output of the signal extracting circuit, a level of the luminance component before correction, and the luminance ratio.

According to the aspect of the invention, when correcting the luminance component of the image signal only for the image signal in the predetermined luminance level range in the predetermined spatial frequency band, the amount of correction of the luminance component is output from the table. As a result, in addition to the above-described effect, it becomes possible to reduce power consumption and cost since the multiplier can be removed.

Moreover, the image processor according to the aspect of the invention may further include a frequency analysis section that analyzes a spatial frequency of the luminance component of the image signal. The luminance component correction amount calculating section may calculate the amount of correction of the luminance component of the image signal according to the luminance ratio and an analysis result of the frequency analysis section.

According to the aspect of the invention, the spatial frequency of the luminance component of the image signal is analyzed, the amount of correction of the luminance component of the image signal is calculated according to the luminance ratio and the analysis result of the spatial frequency of the luminance component only for an image signal in a predetermined luminance level range in a predetermined spatial frequency band, and the luminance component is corrected using the amount of correction. As a result, even in the case where dark and bright portions are mixed, the image signal can be corrected such that the details of both the dark and bright portions can be expressed without uniformly correcting the whole screen. Furthermore, since the detail of the dark portion of the image and the luminance noise can be distinguished from each other, it is possible to avoid the situation where the luminance noise is highlighted together with the detail of the dark portion.

Moreover, in the image processor according to the aspect of the invention, the frequency analysis section may include a high frequency component extracting section that extracts a predetermined high frequency component of the luminance component of the image signal, and the luminance component correction amount calculating section may include a frequency gain calculating section, which calculates a frequency gain corresponding to the high frequency component extracted by the high frequency component extracting section, and may calculate the amount of correction of the luminance component on the basis of the luminance component in the predetermined luminance level range in the spatial frequency band, the frequency gain calculated by the frequency gain calculating section, and the luminance ratio.

According to the aspect of the invention, a predetermined high frequency component of the luminance component is extracted and the amount of correction is calculated on the basis of the frequency gain corresponding to the high frequency component, the luminance component in the predetermined luminance level range in the predetermined spatial frequency band, and the luminance ratio. As a result, in addition to the above-described effect, it is possible to avoid the situation where the luminance noise is highlighted together with the detail of the dark portion since the detail of the dark portion and the luminance noise can be distinguished from each other by a simple process.

Moreover, in the image processor according to the aspect of the invention, the luminance component correction amount calculating section may include a luminance gain calculating section, which calculates a luminance gain corresponding to the level of the luminance component of the image signal, and may calculate the amount of correction of the luminance component on the basis of a signal in the spatial frequency band, the frequency gain, the luminance gain calculated by the luminance gain calculating section, and the luminance ratio.

According to the aspect of the invention, for a signal in a predetermined spatial frequency band, a signal in the level range in the predetermined luminance component can be specified by the luminance gain. As a result, in addition to the above-described effect, the luminance component of the image signal can be corrected according to the environment of use with a simple configuration, only for the luminance component in the predetermined luminance level range in the predetermined spatial frequency band.

Moreover, the image processor according to the aspect of the invention may further include a signal extracting section that extracts a signal in the spatial frequency band from the luminance component of the image signal.

According to the aspect of the invention, in addition to the above-described effect, a component in the predetermined spatial frequency band can be extracted from the luminance components in the predetermined luminance level range with a simple configuration.

Moreover, in the image processor according to the aspect of the invention, the frequency analysis section may include a luminance noise removing section that removes a predetermined luminance noise component from the luminance component of the image signal, and the luminance component correcting section may correct the luminance component of the image signal, from which the luminance noise component has been removed by the luminance noise removing section, using the amount of correction.

According to the aspect of the invention, the luminance component of the image signal from which the luminance noise component has been removed is corrected using the amount of correction calculated by the luminance component correcting section. As a result, in addition to the above-described effect, the details of both dark and bright portions can be expressed and the correction of an image signal for distinguishing the detail of the dark portion of the image from the luminance noise can be performed with high precision.

Moreover, the image processor according to the aspect of the invention may further include a color difference component correcting section that corrects a color difference component of the image signal such that the value of xy chromaticity does not change before and after correction using the luminance component correcting section.

According to the aspect of the invention, the color difference component is corrected simultaneously with the correction of the luminance component such that the value of xy chromaticity does not change before and after correction of the luminance component. As a result, in addition to the above-described effect, the tendency of the colors on the whole screen can be maintained when expressing the detail of the image since it is possible to avoid the situation where the chromaticity of each pixel changes and the tendency of the overall colors on the screen accordingly changes.

Moreover, the image processor according to the aspect of the invention may further include a color difference component correction amount calculating section which calculates the amount of correction of the color difference component of the image signal such that the value of xy chromaticity does not change, on the basis of luminance components of the image signal before and after correction using the luminance component correcting section. The color difference component correcting section may correct the color difference component of the image signal using the amount of correction of the color difference component calculated by the color difference component correction amount calculating section.

According to the aspect of the invention, the color difference component is corrected according to the amount of correction of the luminance component simultaneously with the correction of the luminance component of the image signal. As a result, correction of the image signal capable of expressing the detail of the dark or bright portion of the image becomes possible without changing the value of xy chromaticity before and after correction of the luminance component.

Moreover, the image processor according to the aspect of the invention may further include an adjustment parameter storage section that stores an adjustment parameter of the color difference component. Assuming that the luminance component before correction is Yin, the luminance component after correction is Yout, and the adjustment parameter is b, the color difference component correcting section may correct the color difference component by multiplying the color difference component of the image signal by a color difference gain of $(1-b\times(1-Yout/Yin))$.

According to the aspect of the invention, correction of the color difference component performed simultaneously with the correction of the luminance component of the image signal can be realized by a simple process.

According to another aspect of the invention, there is provided an image display device that displays an image on the basis of an image signal including: the above-described image processor that corrects the image signal; and an image display section that displays an image on the basis of the image signal corrected by the image processor.

According to the aspect of the invention, it becomes possible to provide the image display device capable of improving the expression of the detail of an image regardless of the environment of use.

Moreover, the image display device according to the aspect of the invention may further include a sensor that measures the luminance of output light of the image display section and the luminance of outside light.

According to the aspect of the invention, it becomes possible to provide the image display device which is cheap due to the unified sensor and which is able to improve the expression of the detail of an image regardless of the environment of use.

According to still another aspect of the invention, there is provided an image processing method of correcting an image signal supplied to an image display section including: calculating the amount of correction of a luminance component of the image signal according to visual environment only for an image signal in a predetermined luminance level range in a predetermined spatial frequency band; and correcting the luminance component of the image signal using the amount of correction calculated in the calculating of the amount of correction of the luminance component.

According to the aspect of the invention, the luminance component of the image signal is corrected only for the image signal in the predetermined luminance level range in the predetermined spatial frequency band. Accordingly, even in the case where dark and bright portions are mixed, the image signal can be corrected such that the details of both the dark and bright portions can be expressed without uniformly correcting the whole screen. In addition, since the amount of correction of the luminance component is calculated according to the luminance ratio of the outside light and the output light of the image display section, it becomes possible to provide the image processing method capable of improving the expression of the detail of an image regardless of the environment of use.

According to yet another aspect of the invention, there is provided an image processor that corrects an image signal supplied to an image display section including: a chroma component correction amount calculating section that calculates the amount of correction of a chroma component of the image signal according to visual environment only for an image signal in a predetermined chroma level range in a predetermined spatial frequency band; and a chroma component correcting section that corrects the chroma component of the image signal using the amount of correction calculated by the chroma component correction amount calculating section.

According to the aspect of the invention, the chroma component of the image signal is corrected only for the image signal in the predetermined chroma level range in the predetermined spatial frequency band. Accordingly, even in the case where a low chroma portion and a high chroma portion are mixed, the image signal can be corrected such that the details of both the low chroma portion and the high chroma portion can be expressed without uniformly correcting the whole screen. In addition, since the amount of correction of the chroma component is calculated according to the visual environment, it becomes possible to provide the image processor capable of improving the expression of the detail of an image regardless of the environment of use.

Moreover, the image processor according to the aspect of the invention may further include a conversion circuit that converts a color difference component, which forms the image signal, into a chroma component and a hue component corresponding to the color difference component. The chrome component converted by the conversion circuit may be corrected.

According to the aspect of the invention, even in the case where a high chrome portion and a low chrome portion are mixed, details of the portions can be expressed without changing the hue.

According to further another aspect of the invention, there is provided an image display device that displays an image on the basis of an image signal including: the above-described image processor that corrects the image signal; and an image display section that displays an image on the basis of the image signal corrected by the image processor.

According to the aspect of the invention, it becomes possible to provide the image display device capable of improving the expression of the detail of an image regardless of the environment of use.

According to furthermore another aspect of the invention, there is provided an image processing method of correcting an image signal supplied to an image display section including: calculating the amount of correction of a chroma component of the image signal according to visual environment only for an image signal in a predetermined chroma level range in a predetermined spatial frequency band; and correcting the chrome component of the image signal using the amount of correction calculated in the calculating of the amount of correction of the chroma component.

According to the aspect of the invention, the chroma component of the image signal is corrected only for the image signal in the predetermined chrome level range in the predetermined spatial frequency band. Accordingly, even in the case where a low chroma portion and a high chroma portion are mixed, the image signal can be corrected such that the details of both the low chroma portion and the high chrome portion can be expressed without uniformly correcting the whole screen. In addition, since the amount of correction of the chroma component is calculated according to the visual environment, it becomes possible to provide the image processing method capable of improving the expression of the detail of an image regardless of the environment of use.

BRIEF DESCRIPTION OF THE DRAWINGS

The invention will be described with reference to the accompanying drawings, wherein like numbers reference like elements.

FIG. 5 is a view for explaining an operation of the correction intensity calculating unit in FIG. 1.

FIG. 9 is a view for explaining an operation of a weight calculating circuit in FIG. 8.

FIG. 10 is a view for explaining an operation of a luminance gain calculating circuit in FIG. 8.

FIGS. 11A and 11B are views for explaining a luminance gain coefficient calculated by the luminance gain calculating circuit in FIG. 10.

FIG. 12 is a block diagram illustrating an example of the configuration of a color difference gain calculating circuit in FIG. 6.

FIGS. 18A to 18C are views for explaining the operations of first to third LUTs in FIG. 17.

FIG. 20 is a view for explaining an operation of a LUT in FIG. 19.

FIGS. 34A to 34C are views for explaining the operations of first to third LUTs in FIG. 33.

FIG. 36 is a view for explaining an operation of a LUT in FIG. 35.

DESCRIPTION OF EXEMPLARY EMBODIMENTS

Hereinafter, embodiments of the invention will be described in detail with reference to the accompanying drawings. In addition, the embodiments described below are not intended to limit the contents of the invention defined by the appended claims. In addition, all of the configurations described below are not necessarily essential components of the invention.

Hereinafter, a projector is described as an example of an image display device of the invention. However, the image display device of the invention is not limited to the projector.

First Embodiment

Figure 1:
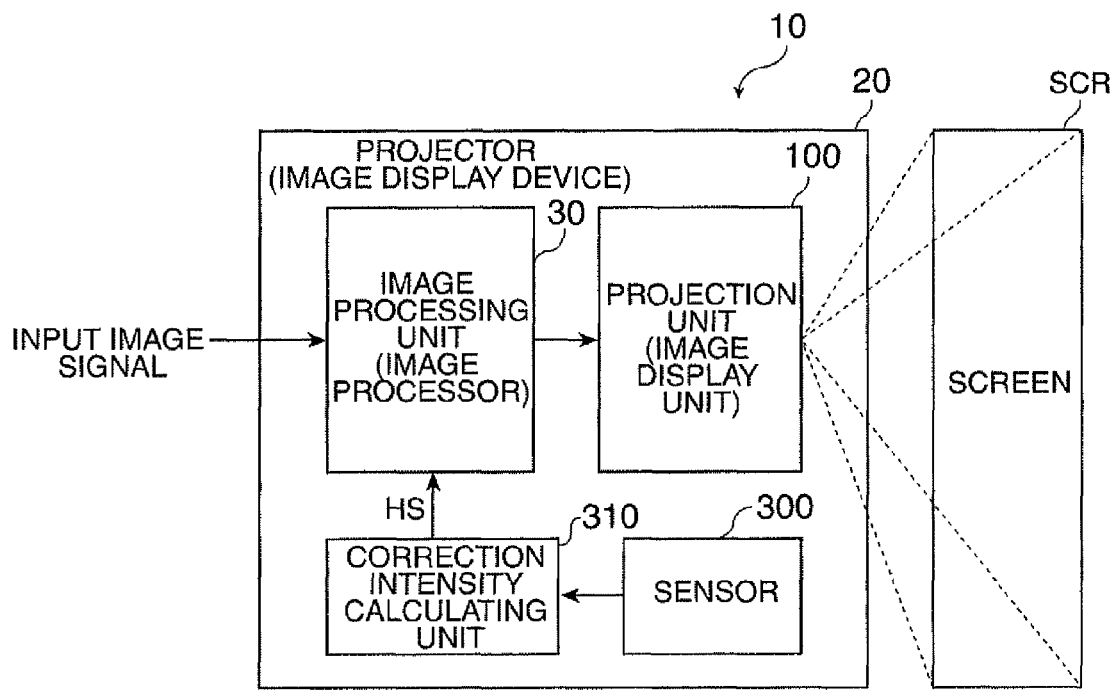
FIG. 1 is a block diagram illustrating an example of the configuration of an image display system according to a first embodiment.

FIG. 1 is a block diagram illustrating an example of the configuration of an image display system according to a first embodiment of the invention.

An image display system 10 includes a projector (in a broad sense, an image display device) and a screen SCR. The projector 20 modulates light from a light source (not shown)

on the basis of an input image signal and displays an image by projecting the modulated light on the screen SCR.

The projector 20 includes an image processing unit 30 (in a broad sense, an image processor), a projection unit 100 (in a broad sense, an image display unit), a sensor 300, and a correction intensity calculating unit 310. Although FIG. 1 shows that the sensor 300 and the correction intensity calculating unit 310 are built in the projector 20, at least one of the sensor 300 and the correction intensity calculating unit 310 may be provided outside the projector 20. Alternatively, at least one of the sensor 300 and the correction intensity calculating unit 310 may be built in the image processing unit 30 or the projection unit 100.

The sensor 300 measures the luminance in a projection region of the environment of use (ambient light, outside light) of the projector 20 and the maximum output luminance of the projection unit 100. The function of such a sensor 300 is realized by a known measuring apparatus, such as a so-called image sensor or luminance meter. On the basis of the luminance measured by the sensor 300, the correction intensity calculating unit 310 calculates the correction intensity HS of an input image signal of the image processing unit 30, and outputs the correction intensity HS to the image processing unit 30.

Using the correction intensity HS from the correction intensity calculating unit 310, the image processing unit 30 corrects the input image signal so that the detail of a dark or bright portion of a display image can be expressed without affecting the luminance region other than the object to be corrected, and outputs the corrected image signal to the projection unit 100. The projection unit 100 projects onto the screen SCR the light modulated on the basis of the image signal from the image processing unit 30.

Figure 2:
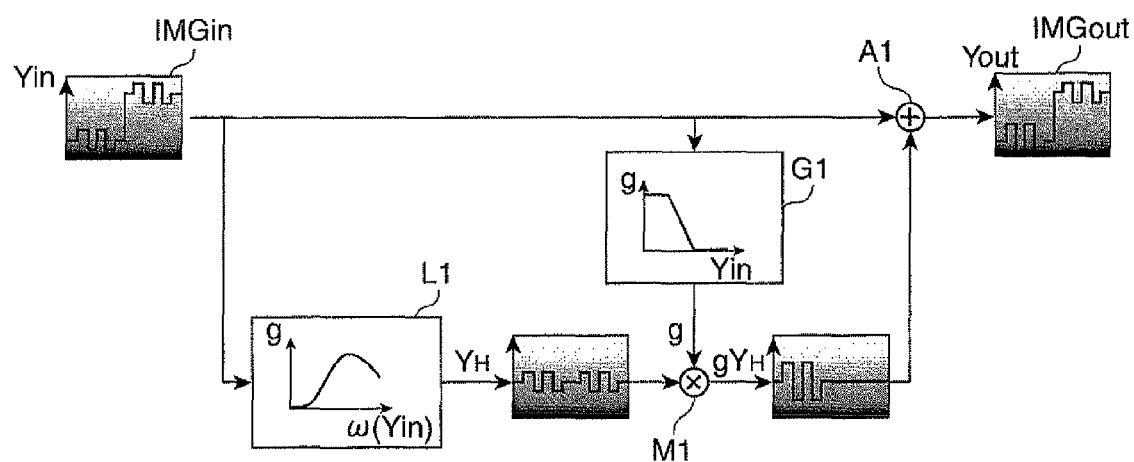
FIG. 2 is an explanatory view illustrating the gray level correction processing performed in an image processing unit in FIG. 1.

FIG. 2 is an explanatory view illustrating the gray level correction processing performed in the image processing unit 30 in FIG. 1. FIG. 2 schematically shows the characteristics of an image expressed by each image signal under the gray level correction processing, where the horizontal axis indicates the horizontal position of the image and the vertical axis indicates the luminance level.

An input image IMGin is, for example, an image with low luminance (low gray level) at the left side and high luminance (high gray level) at the right side. In the input image IMGin, there is a small gray level change both in the region where the luminance is low and the region where the luminance is high. A signal extracting unit L1 extracts a signal $Y_H$ of a luminance component in a predetermined spatial frequency band from the luminance components of the image signal of the input image IMGin. In FIG. 2, the gain is set corresponding to the spatial frequency and the signal extracting unit L1 extracts the signal $Y_H$ of the luminance component in the spatial frequency band where this gain is large.

In addition, a luminance gain calculating unit G1 calculates a gain coefficient g (luminance gain coefficient. In a broad sense, a luminance gain; the same hereinbelow) corresponding to the level of the luminance component of the image signal of the input image. In FIG. 2, the luminance gain calculating unit G1 calculates the gain coefficient g such that the gain coefficient g increases in the region where the level of the luminance component is low and the gain coefficient g is almost 0 in the region where the level of the luminance component is high.

As a result, a multiplier M1 generates a signal $gY_H$ by multiplying the signal $Y_H$ extracted by the signal extracting unit L1 by the gain coefficient g calculated by the luminance gain calculating unit G1. The signal $gY_H$ is a signal corresponding to the amount of correction of a luminance component of the input image signal. An adder A1 adds a luminance signal Yin of the input image signal and the signal $gY_H$ and outputs a luminance signal Yout which forms an image signal after gray level correction.

Moreover, in the first embodiment, in one processing shown in FIG. 2, highlight processing of the detail is made to change with the correction intensity corresponding to the environment of use of the projector 20.

Figure 3:
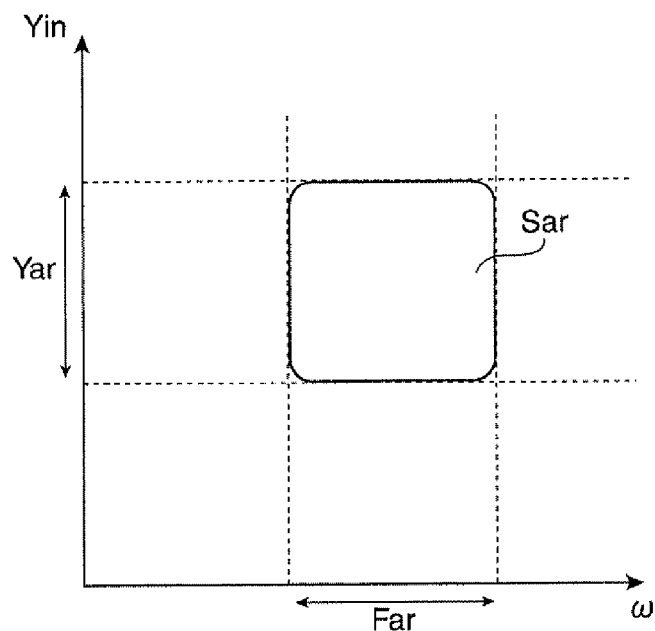
FIG. 3 is a view for explaining an operation of the image processing unit in FIG. 1.

FIG. 3 is a view for explaining an operation of the image processing unit 30 in FIG. 1. In FIG. 3, the vertical axis indicates a luminance component of an input image signal, and the horizontal axis indicates the spatial frequency of the luminance component.

The image processing unit 30 in FIG. 1 calculates only the amount of correction of a luminance component of an image signal in a spatial frequency band Far (predetermined spatial frequency band) according to the environment (visual environment) of use of the projector 20 and corrects the luminance component of the image signal using the amount of correction. More specifically, the image processing unit 30 uses, for example, the luminance ratio between the outside light and the output light of the projection unit 100 of the projector 20 as the environment (visual environment) of use of the projector 20. In addition, in the spatial frequency band Far extracted by the signal extracting unit L1, the image processing unit 30 performs the gray level correction of a signal in a predetermined level range Yar (range Sar in FIG. 3) of the luminance component Yin of the input image signal, which has been calculated by the luminance gain calculating unit G1, according to the luminance ratio. As a result, regardless of the environment of use, the luminance component can be changed only in the spatial frequency band Far extracted by the signal extracting unit L1 and the predetermined level range Yar of the luminance component Yin of the input image signal calculated by the luminance gain calculating unit G1 without changing the tendency of the overall luminance.

Since the spatial frequency band extracted by the signal extracting unit L1 or the level range of the luminance component where the gain coefficient g is calculated by the luminance gain calculating unit G1 can each be designated, the change in luminance of the input image signal can be increased only in the designated level range of the luminance component of the designated spatial frequency band. Accordingly, for example, by increasing the luminance gain coefficient for a luminance component with low luminance, which is a dark portion, in the luminance gain calculating unit G1, the detail of the dark portion can be expressed without reducing the luminance range of other gray levels. In addition, the whole screen is not uniformly corrected. Accordingly, even in the case where dark and bright portions are mixed, the details of both the dark and bright portions can be expressed without uniformly increasing the luminance of the dark portion or uniformly decreasing the luminance of the bright portion.

Hereinafter, an example of the configuration of the projector 20 in the first embodiment for realizing such gray level correction will be described in detail. An example in which an image signal is formed by a luminance signal Y and color difference signals U and V will be described below. However, an image signal in the invention is not limited thereto.

Figure 4:
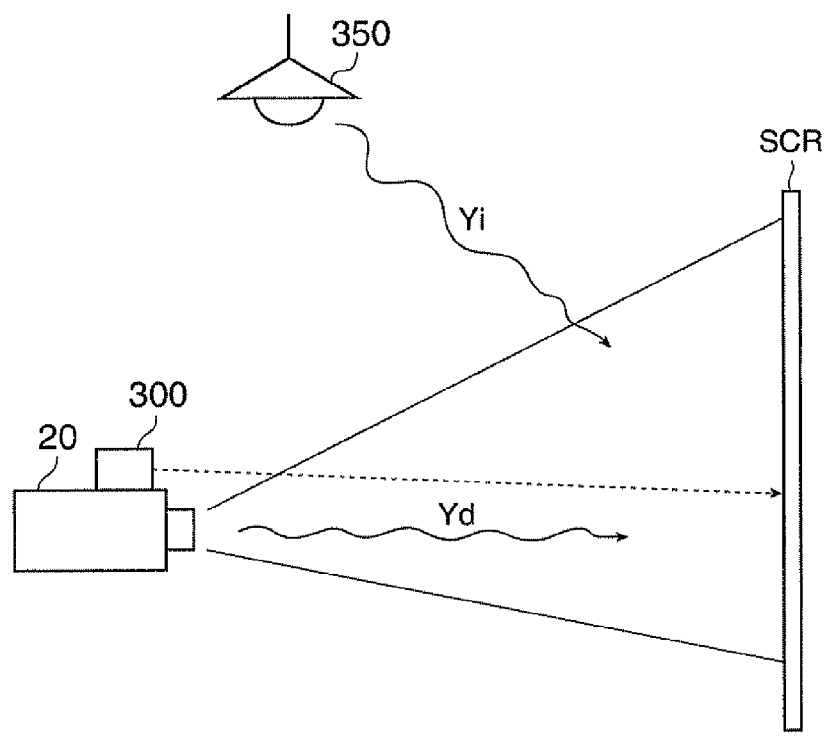
FIG. 4 is an explanatory view illustrating a sensor and a correction intensity calculating unit in FIG. 1.

FIG. 4 is an explanatory view illustrating the sensor 300 and the correction intensity calculating unit 310 shown in FIG. 1. FIG. 4 schematically illustrates the situation where the projector 20 of the image display system 10 in FIG. 1 projects an image onto the screen SCR when viewed from the lateral direction. In FIG. 4, the same sections as in FIG. 1 are denoted by the same reference numerals, and the explanation will be appropriately omitted.

For example, the projector 20 projects an image onto the screen SCR under the illumination using exterior light 350. In this case, since the exterior light 350 is reflected on the screen SCR, the visibility of a projected image on the screen SCR largely changes. Therefore, the sensor 300 acquires the luminance Yi of the outside light of the exterior light 350 and the maximum luminance Yd of the output light of the projection unit 100 of the projector 20, and the correction intensity calculating unit 310 calculates the correction intensity HS on the basis of the luminancees Yi and Yd.

In the first embodiment, the sensor 300 is positioned toward the direction of the projection region of the projector 20, and the projector 20 displays a black image and a white image. When a black image is projected, leakage light from the projector 20 is neglected and a measurement result of the sensor 300 is determined to be a luminance Ys1 (Ys1≅Yi) equivalent to the luminance Yi of the exterior light 350. On the other hand, when a white image is projected, the test result of the sensor 300 is determined to be a luminance Ys2 (Ys2≅Yi+Yd) which is obtained by adding the luminance Yi of the exterior light 350 to the maximum luminance Yd of the output light of the projector 20 (projection unit 100). Accordingly, the maximum luminance Yd of the output light of the projector 20 (projection unit 100) can be calculated by subtracting the luminance Ys1 from the luminance Ys2. The correction intensity calculating unit 310 calculates the correction intensity corresponding to the luminance ratio R (=Yi/Yd) between the luminance Yi of the outside light and the luminance Yd of the output light of the projection unit 100.

FIG. 5 is a view for explaining an operation of the correction intensity calculating unit 310 in FIG. 1.

The correction intensity calculating unit 310 is realized by a look up table (hereinafter, referred to as a LUT) which has the luminance ratio R as the input and the correction intensity HS as the output. For this reason, correction intensities HSa, HSb, HSc, ... corresponding to the luminance ratios Ra, Rb, Rc, ... are stored beforehand in the correction intensity calculating unit 310, such that the correction intensity corresponding to the luminance ratio R is output when the luminance ratio R is input.

It is preferable that the correction intensity calculating unit 310 stores the correction intensity HS corresponding to the luminance ratio R such that the correction intensity increases as the luminance ratio increases (as the outside light becomes bright). In this way, an adverse effect, such as a drop in luminance contrast when the environment of use is bright (when the luminance Yi is large), can be reliably prevented.

In addition, the sensor 300 may calculate the luminance ratio R on the basis of its own measurement result (luminancees Yi and Yd) and then output the luminance ratio R to the correction intensity calculating unit 310, or the correction intensity calculating unit 310 may calculate the luminance ratio R on the basis of the measurement result (luminancees Yi and Yd) from the sensor 300 and then output the correction intensity HS corresponding to the luminance ratio R.

Figure 6:
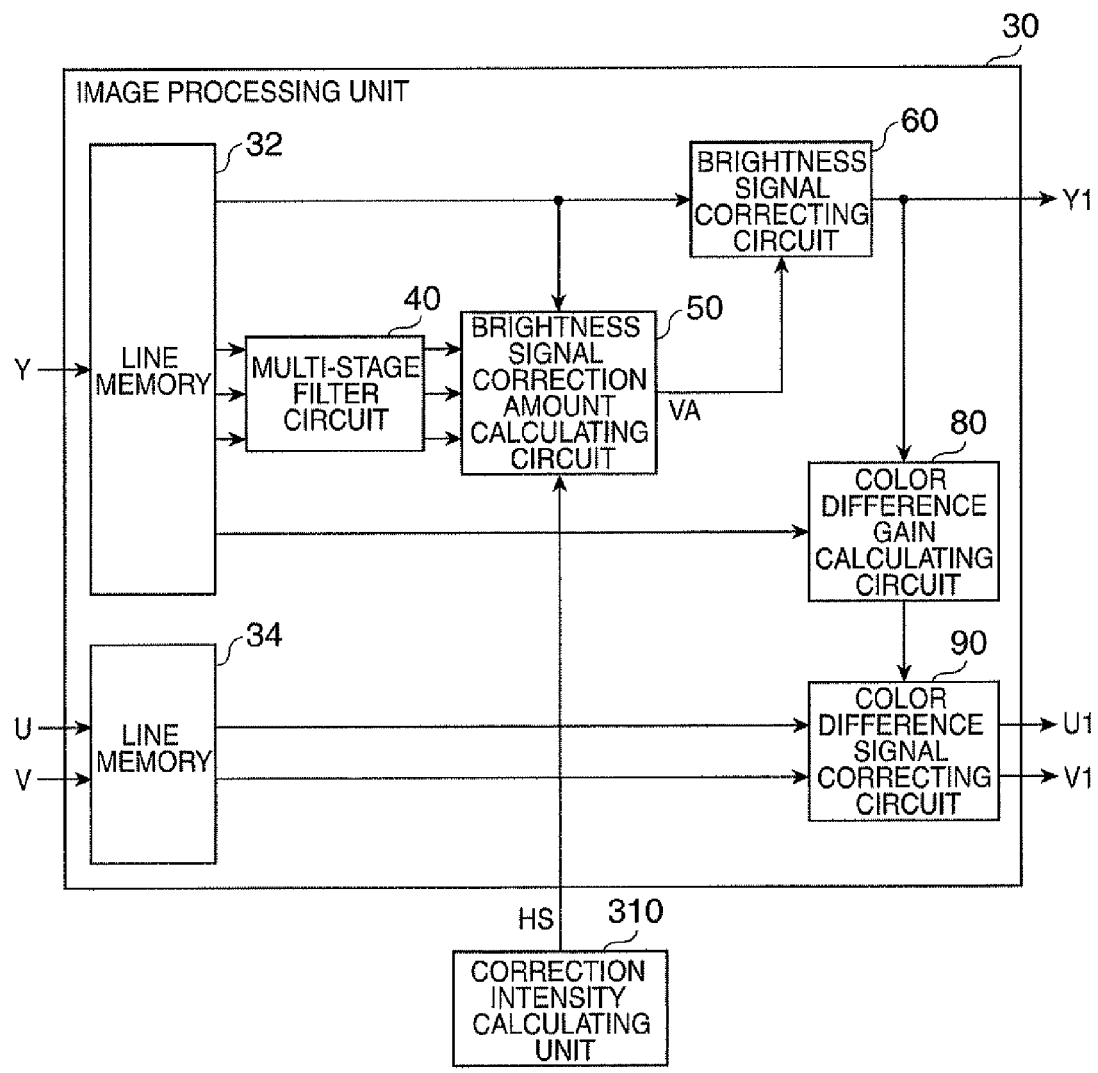
FIG. 6 is a block diagram illustrating an example of the hardware configuration of the image processing unit in FIG. 1.

FIG. 6 is a block diagram illustrating an example of the hardware configuration of the image processing unit 30 in FIG. 1. In FIG. 6, the correction intensity calculating unit 310 provided outside the image processing unit 30 is shown together.

The image processing unit 30 includes a line memory 32, a multi-stage filter circuit (signal extracting circuit) 40, a luminance signal correction amount calculating circuit (luminance component correction amount calculating section) 50, and a luminance signal correcting circuit (luminance component correcting section) 60. In addition, the image processing unit 30 includes a line memory 34, a color difference gain calculating circuit (color difference component correction amount calculating section) 80, and a color difference signal correcting circuit (color difference component correcting section) 90.

The line memory 32 stores a luminance signal Y (luminance component of an input image signal) which forms an input image signal. The line memory 32 stores the luminance signal Y corresponding to the number of lines required in the multi-stage filter circuit 40.

The multi-stage filter circuit 40 extracts a signal in the predetermined spatial frequency band from the luminance signal Y (luminance component of the image signal) stored in the line memory 32. The multi-stage filter circuit 40 can realize a function of the signal extracting unit L1 in FIG. 2.

The luminance signal correction amount calculating circuit 50 calculates the amount of correction of the luminance signal on the basis of the output of the multi-stage filter circuit 40, the luminance signal stored in the line memory 32, and the correction intensity HS from the correction intensity calculating unit 310. According to the correction intensity HS from the correction intensity calculating unit 310, the luminance signal correction amount calculating circuit 50 can calculate the amount of correction for the luminance signal in a predetermined luminance level range of the luminance signals in the predetermined spatial frequency band extracted by the multi-stage filter circuit 40. The luminance signal correction amount calculating circuit 50 can realize a function of the luminance gain calculating unit G1 in FIG. 2.

The luminance signal correcting circuit 60 corrects the luminance signal stored in the line memory using the amount of correction calculated by the luminance signal correction amount calculating circuit 50 and outputs it as a corrected luminance signal Y1.

In addition, the image processing unit 30 is configured to be able to correct a color difference signal simultaneously with the correction of the luminance signal. Accordingly, the color difference signals U and V (color difference components of the input image signal), which correspond to the luminance signal, are stored in the line memory 34 in synchronization with a timing at which the luminance signal Y is stored in the line memory 32.

The color difference gain calculating circuit 80 calculates the amount of correction of the color difference signals U and V on the basis of the luminance signals Y and Y1 before and after correction using the luminance signal correcting circuit 60, for example, such that the value of xy chromaticity of the XYZ colorimetric system (CIE 1931 standard colorimetric system) does not change. Here, the color difference gain calculating circuit 80 calculates the gain coefficient corresponding to the amount of correction of the color difference signal.

The color difference signal correcting circuit corrects the color difference signals U and V stored in the line memory 34 using the amount of correction calculated by the color difference gain calculating circuit 80 and outputs them as corrected color difference signals U1 and V1. As a result, the color difference signal correcting circuit 90 can correct the color difference signals U and V such that the value of xy chromaticity does not change before and after correction using the luminance signal correcting circuit 60.

Thus, the image processing unit 30 can correct the luminance signal according to the environment of use of the projector 20 only for luminance signals with a predetermined luminance level in a predetermined spatial frequency band. In addition, the image processing unit 30 can correct a color difference signal according to the amount of correction of the luminance signal simultaneously with the correction of the luminance signal.

Next, each block which forms the image processing unit 30 will be described.

Figure 7:
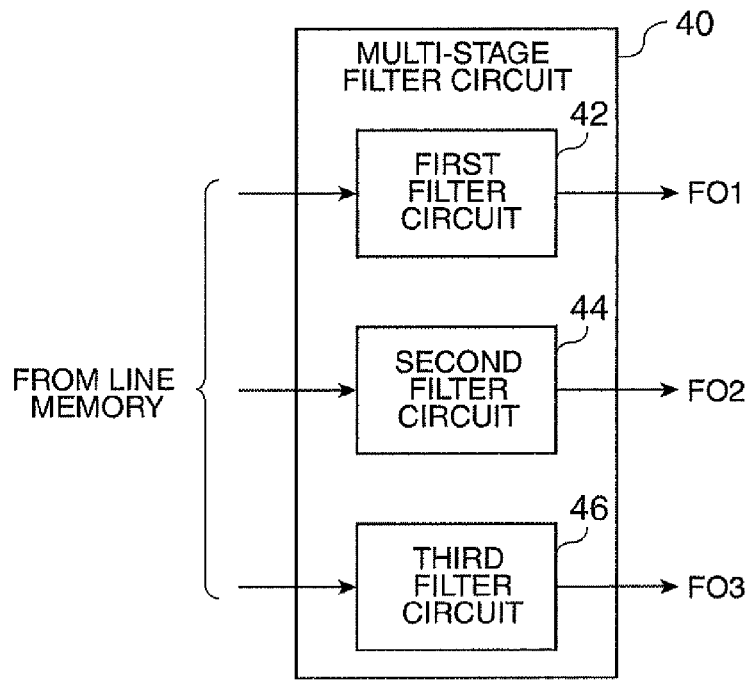
FIG. 7 is a block diagram illustrating an example of the configuration of a multi-stage filter circuit in FIG. 6.

FIG. 7 is a block diagram illustrating an example of the configuration of the multi-stage filter circuit 40 in FIG. 6. In FIG. 7, the same sections as in FIG. 6 are denoted by the same reference numerals, and the explanation will be appropriately omitted.

The multi-stage filter circuit 40 includes first to third filter circuits 42, 44, and 46 with different filter sizes. In FIG. 7, an example in which the multi-stage filter circuit 40 performs filtering with three kinds of filter circuits will be described. However, the invention is not limited to the number of filter circuits.

The multi-stage filter circuit 40 has a plurality of filter circuits, and the frequency bands of signals extracted by the plurality of filter circuits are different. Each of the filter circuits outputs the result of a convolution operation of pixel values of pixels, which are arrayed in the horizontal and vertical directions of an image, and the filter coefficient matrix.

The first filter circuit 42 can output the result after filtering is performed according to the following expression.

$$FO1 = \sum_{(i,j) \in F} a(i, j) Y(x+i, y+j) \left( -\frac{s-1}{2} \le i, j \le \frac{s-1}{2} \right) \quad (1)$$

In the above expression, it is assumed that the output of the first filter circuit 42 is FO1, the luminance signal of the coordinates (x, y) is Y(x, y), the filter coefficient is a, (i, j) are the relative coordinates with respect to the object pixel and are within the range of the above expression, and the filter size is s. Luminance signals of the line number (vertical scan line number), which correspond to the filter size, are input to each filter circuit.

Although the output of the first filter circuit 42 is shown in the above expression, the second and third filter circuits 44 and 46 may also output the same filtering result as in the above expression (outputs FO2 and FO3).

In FIG. 7, the filter size of the first filter circuit 42 is set to '3', the filter size of the second filter circuit 44 is set to '5', and the filter size of the third filter circuit 46 is set to '7'. However, the invention is not limited to the filter size.

Figure 8:
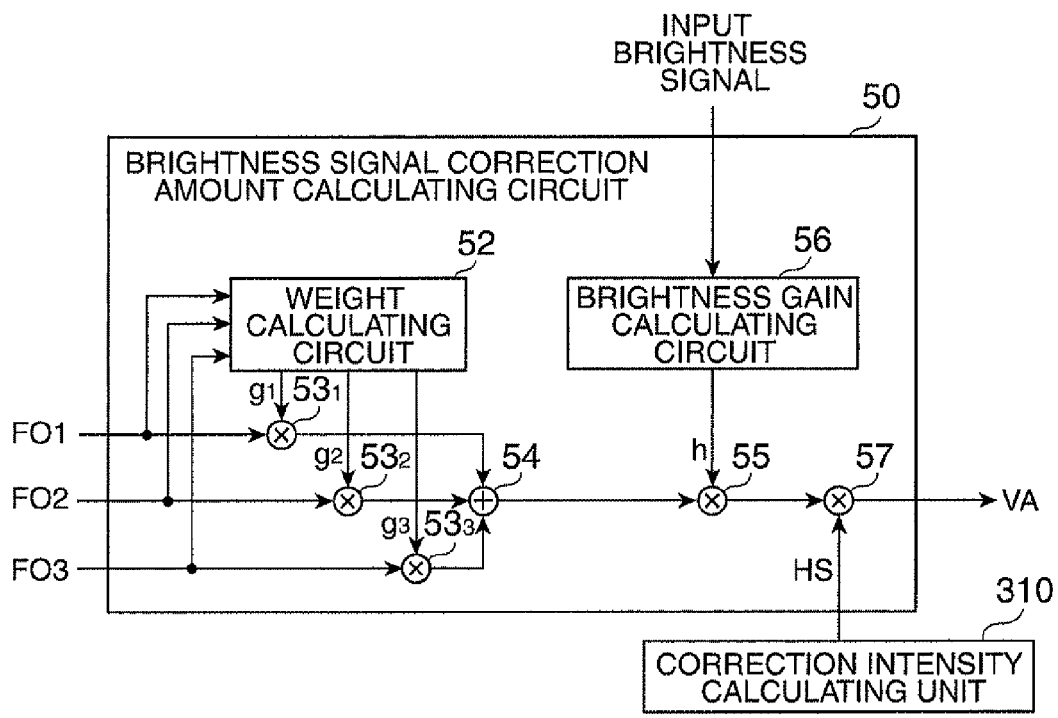
FIG. 8 is a block diagram illustrating an example of the configuration of a luminance signal correction amount calculating circuit in FIG. 6.

FIG. 8 is a block diagram illustrating an example of the configuration of the luminance signal correction amount calculating circuit 50 in FIG. 6. In FIG. 8, the same sections as in FIG. 6 are denoted by the same reference numerals, and the explanation will be appropriately omitted. In FIG. 8, the correction intensity calculating unit 310 provided outside the image processing unit 30 is shown together. FIG. 9 is a view for explaining the operation of a weight calculating circuit 52 in FIG. 8. FIG. 10 is a view for explaining the operation of a luminance gain calculating circuit 56 in FIG. 8. FIGS. 11A and 11B are views for explaining the luminance gain coefficient h calculated by the luminance gain calculating circuit 56 in FIG. 10. In FIGS. 11A and 11B, the horizontal axis indicates the luminance, and the vertical indicates the luminance gain coefficient h.

The luminance signal correction amount calculating circuit 50 includes the weight calculating circuit 52, multipliers $53_1$ to $53_3$, an adder 54, the luminance gain calculating circuit 56, and multipliers 55 and 57.

Outputs of the first to third filter circuits 42 to 46, which form the multi-stage filter circuit 40, are input to the weight calculating circuit 52. In addition, the weight calculating circuit 52 calculates weight coefficients $g_1$ to $g_3$ according to the combination of the outputs of the first to third filter circuits 42 to 46, as shown in FIG. 9.

Such a weight calculating circuit 52 is realized by a LUT which has the outputs of the first to third filter circuits 42 to 46 as the inputs and has the weight coefficients $g_1$ to $g_3$ as the outputs. Accordingly, weight coefficients ($g_1$a, $g_2$a, $g_3$a), ($g_1$b, $g_2$b, $g_3$b), ($g_1$c, $g_2$c, $g_3$c), . . . which correspond to the combination of the outputs of the first to third filter circuits 42 to 46, are stored beforehand in the weight calculating circuit 52, such that the weight coefficients, which correspond to the combination, are output when the outputs FO1 to FO3 of the first to third filter circuits 42 to 46 are input.

The weight coefficient $g_1$ is input to the multiplier $53_1$ to which the output FO1 of the first filter circuit 42 is input. The multiplier $53_1$ outputs a result, which is obtained by multiplying the output FO1 of the first filter circuit 42 by the weight coefficient $g_1$, to the adder 54.

The weight coefficient $g_2$ is input to the multiplier $53_2$ to which the output FO2 of the second filter circuit 44 is input. The multiplier $53_2$ outputs a result, which is obtained by multiplying the output FO2 of the second filter circuit 44 by the weight coefficient $g_2$, to the adder 54.

The weight coefficient $g_3$ is input to the multiplier $53_3$ to which the output FO3 of the third filter circuit 46 is input. The multiplier $53_3$ outputs a result, which is obtained by multiplying the output FO3 of the third filter circuit 46 by the weight coefficient $g_3$, to the adder 54.

The adder 54 adds the multiplication results of the multipliers $53_1$ to $53_3$ and outputs the addition result to the multiplier 55. The luminance gain coefficient h calculated by the luminance gain calculating circuit 56 is input to the multiplier 55.

A luminance signal which forms the input image signal is input to the luminance gain calculating circuit 56. In addition, the luminance gain calculating circuit 56 calculates the luminance gain coefficient h (luminance gain) corresponding to the level (level of the luminance component of the image signal) of the luminance signal, as shown in FIG. 10.

Such a luminance gain calculating circuit 56 is realized by the LUT which has a luminance signal (luminance component of an image signal) as the inputs and has the luminance gain coefficient h as the outputs. For this reason, luminance gain coefficients ha, hb, hc, . . . which correspond to the luminance signals (input luminance signals) which form the input image signal, are stored beforehand in the luminance gain calculating circuit 56, such that the luminance gain coefficient corresponding to the luminance signal is output when the luminance signal which form the input image signal is input. Since the luminance gain coefficient corresponding to the desired luminance signal can be designated in the luminance gain calculating circuit 56, the amount of correction can be generated only for the designated gray level.

It is preferable that the luminance gain calculating circuit 56 outputs the luminance gain coefficient h which is large in a high luminance region and a low luminance region and is almost 0 in a middle luminance region as shown in FIG. 11A, for example. Alternatively, it is preferable that the luminance gain calculating circuit 56 outputs the luminance gain coefficient h which is large in a low luminance region and is almost 0 in the other luminance regions as shown in FIG. 11B, for example. In this way, an input image signal can be corrected so that the detail of a dark or bright portion of a display image can be expressed without affecting the other luminance regions.

The multiplier 55 multiplies the addition result of the adder 54 by the luminance gain coefficient h from the luminance gain calculating circuit 56. The multiplication result of the multiplier 55 is input to the multiplier 57. The correction intensity HS calculated by the correction intensity calculating unit 310 as described above is input to the multiplier 57. The multiplier 57 outputs a correction signal VA corresponding to the amount of correction of the luminance signal by multiplying the multiplication result of the multiplier 55 by the correction intensity HS. The correction signal VA is input to the luminance signal correcting circuit 60.

Thus, the luminance signal correction amount calculating circuit 50 can calculate the amount of correction of the luminance signal on the basis of the signal in the predetermined spatial frequency band extracted by the multi-stage filter circuit 40 (in a broad sense, a signal extracting circuit), the luminance gain coefficient calculated by the luminance gain calculating circuit 56, and the correction intensity HS from the correction intensity calculating unit 310 corresponding to the environment of use of the projector 20. Since the correction intensity HS corresponds to the luminance ratio R, the luminance signal correction amount calculating circuit 50 can calculate the amount of correction of the luminance signal on the basis of the signal in a predetermined spatial frequency band, the luminance gain coefficient, and the luminance ratio. In addition, the luminance signal correcting circuit 60 outputs the corrected luminance signal Y1 by adding the correction signal VA from the luminance signal correction amount calculating circuit 50 to the luminance signal which forms the input image signal, for example.

In addition, the correction processing of a color difference signal which corresponds to the amount of correction of the luminance signal and which is performed simultaneously with the correction of the luminance signal can be realized by the following configuration.

FIG. 12 is a block diagram illustrating an example of the configuration of the color difference gain calculating circuit 80 in FIG. 6. In FIG. 12, the same sections as in FIG. 6 are denoted by the same reference numerals, and the explanation will be appropriately omitted.

The color difference gain calculating circuit 80 includes a color difference signal adjusting circuit 82 and an adjustment parameter storage section 84. The luminance signal (luminance component of the input image signal) Yin which forms the input image signal, the luminance signal Yout obtained by correcting the luminance signal Yin as described above, and an adjustment parameter b stored in the adjustment parameter storage section 84 are input to the color difference signal adjusting circuit 82. In addition, the color difference signal adjusting circuit 82 calculates a color difference gain coefficient (color difference gain) gc using the luminance signals Yin and Yout and the adjustment parameter b.

More specifically, the color difference gain calculating circuit 80 calculates the color difference gain coefficient gc according to the following expression.

$$gc = 1 - b \times (1 - Yout/Yin) \qquad (2)$$

In the above expression, the adjustment parameter b is a parameter for adjusting the chromaticity. When the adjustment parameter b is the color difference signal (color difference component) which forms the input image signal is output without being corrected. On the other hand, when the adjustment parameter b is "1", the color difference signal is also corrected according to the amount of correction of the luminance signal so that the chromaticity is not changed before and after correction of the luminance signal of the input image signal. Although the adjustment parameter b can be set to a value which is larger than "0" and smaller than "1", the adjustment parameter b is preferably "1" in the first embodiment.

Figure 13:
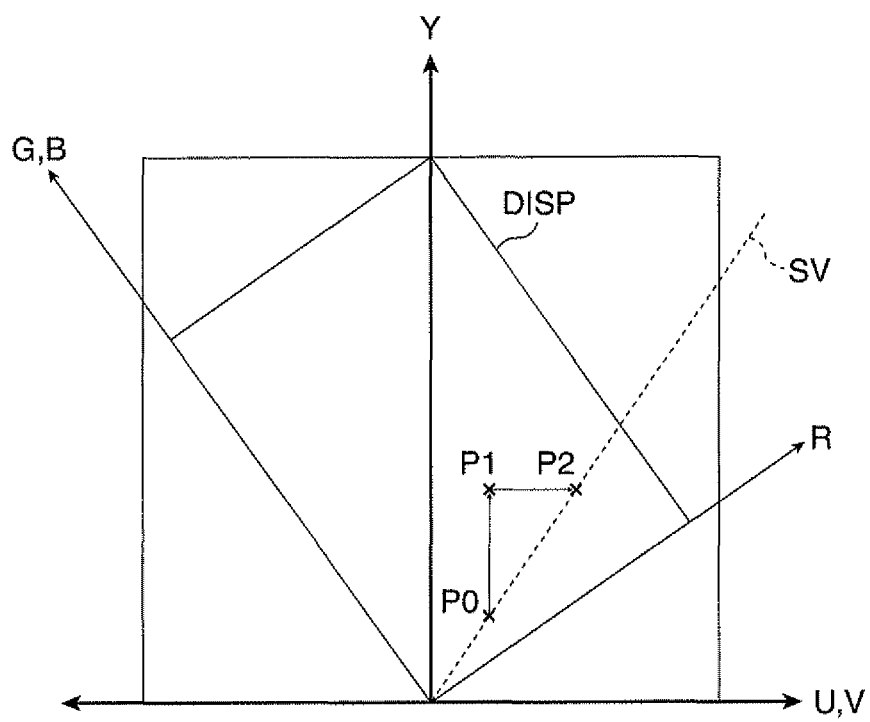
FIG. 13 is a view for explaining an example of the operation of the color difference gain calculating circuit of FIG. 12.

FIG. 13 is a view for explaining an example of the operation of the color difference gain calculating circuit 80 in FIG. 12. In FIG. 13, the adjustment parameter b is assumed to be "1".

When the color space, in which the luminance signal is shown on the vertical axis and the color difference signal is shown on the horizontal axis, is expressed, R, and G, and B components of the RGB are defined in the directions shown in FIG. 13. Here, a region DISP indicates the color gamut which can be reproduced in the display device. In this case, when the color of the input image signal is at the coordinate P0, the value of the xy chromaticity diagram is equal on the isopleth SV passing through the coordinate P0.

However, when the luminance signal which forms the input image signal is corrected as described above, it moves to the coordinate P1. For this reason, the tendency of the color after correcting the luminance signal changes since the coordinate P1 does not exist on the isopleth SV.

Therefore, the color difference gain calculating circuit 80 calculates the color difference gain coefficient gc in order to correct the color difference signal according to the amount of correction of the luminance signal so that the color of the input signal at the coordinate P0 is converted to the coordinate P2 on the isopleth SV. This makes it possible to maintain the tendency of the colors on the whole screen without changing the luminance level after correction even if the luminance signal is corrected. As a result, visually natural correction can be realized without changing the chromaticity of each pixel before and after correction.

The color difference gain coefficient gc calculated in this way is input to the color difference signal correcting circuit 90. The color difference signal correcting circuit 90 multiplies the color difference gain coefficient gc by the color difference signal V from the line memory 34 while multiplying the color difference gain coefficient gc by the color difference signal U from the line memory 34. The color difference signals U and V corrected in this way are input to the projection unit 100.

Thus, the image processing unit 30 can correct not only the luminance signal but also the color difference signal simultaneously with the luminance signal. As a result, since it is possible to avoid the situation where the chromaticity of each pixel changes according to the amount of correction of the luminance signal and the tendency of the overall colors on the screen accordingly changes, the tendency of the colors on the whole screen can be maintained when expressing the detail of the image.

The processing of the image processing unit 30 in the first embodiment may also be realized by software processing. In this case, the image processing unit 30 includes a central processing unit (hereinafter, simply referred to as a CPU) and a read only memory (hereinafter, simply referred to as a ROM) or a random access memory (hereinafter, simply referred to as a RAM). The image processing unit 30 performs the correction processing of the luminance component and the color difference component by controlling the hardware, such as the multiplier and the adder, by making the CPU, which has read a program stored in the ROM or RAM, execute the processing corresponding to the program.

Figure 14:
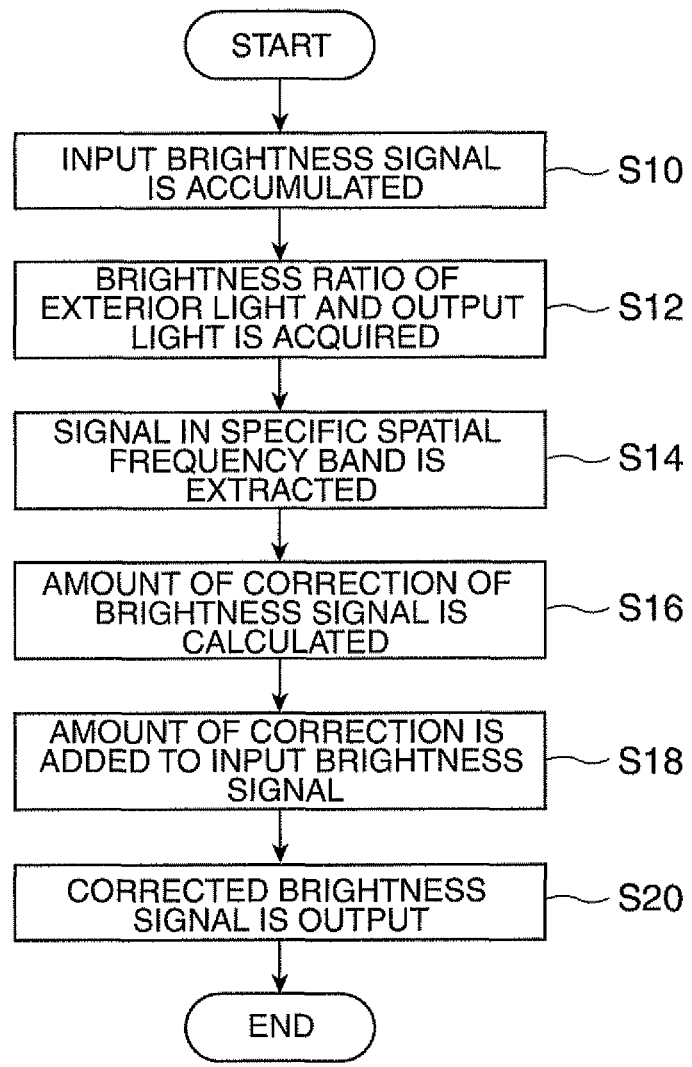
FIG. 14 is a flow chart illustrating an example of correction processing of a luminance signal of the image processing unit in the first embodiment.

FIG. 14 is a flow chart illustrating an example of correction processing of a luminance signal of the image processing unit 30 in the first embodiment. In the case of realizing the processing in FIG. 14 with software, a program for realizing the processing shown in FIG. 14 is stored in the ROM or RAM provided in the image processing unit 30.

First, as an input luminance signal accumulating step (step S10), the image processing unit 30 accumulates a luminance signal (input luminance signal) which forms an input image signal. In this case, the luminance signal is stored in the line memory 32 or the RAM used for realizing the function of the line memory 32.

Then, as a use environment information acquisition step (step S12), the image processing unit 30 acquires the luminance ratio (in a broad sense, the use environment information or visual environment) calculated on the basis of the luminance of exterior light measured by the sensor 300 and the maximum luminance of output light of the projection unit 100. For example, as described above, the luminance ratio R may be calculated on the basis of the luminance when the projection unit 100 of the projector 20 displays a black image and the luminance when the projection unit 100 displays a white image.

Then, the image processing unit 30 extracts a specific spatial frequency band of the luminance signal as a signal extracting step (step S14). For example, the multi-stage filter circuit 40 extracts the luminance signal in the predetermined spatial frequency band. Or when realizing the above by software processing, the CPU controls the multiplier or the adder used for realizing the function of the multi-stage filter circuit 40 to thereby extract the luminance signal in the spatial frequency band.

Then, the image processing unit 30 calculates the amount of correction of the luminance signal as a luminance component correction amount calculating step (step S16). That is, the luminance signal correction amount calculating circuit 50 outputs the correction signal VA obtained by performing weighting according to the signal extracted by the multi-stage filter circuit 40 and then performing multiplication using the coefficient corresponding to the luminance level of the luminance signal which forms the input image signal. Or when realizing the above by software processing, the CPU generates the correction signal VA obtained by performing weighting according to the signal extracted by the signal extraction processing and then performing multiplication using the coefficient corresponding to the luminance level of the luminance signal which forms the input image signal. That is, in step S16, the luminance gain corresponding to the level of the luminance component of the image signal is calculated as a luminance gain calculating step. In addition, the amount of correction of the luminance component is calculated on the basis of the signal in the spatial frequency band extracted in step S14 and the luminance gain calculated in step S16.

Then, the image processing unit 30 corrects the luminance signal, which forms the input image signal, using the amount of correction calculated in step S16 as a luminance component correcting step (step S18) and outputs the corrected luminance signal (step S20), completing the series of the process (End). That is, in step S18, the luminance signal correcting circuit 60 generates the corrected luminance signal by adding the correction signal VA to the luminance signal which forms the input image signal. Or when realizing the above by software processing, the CPU generates the corrected luminance signal by adding the correction signal VA to the luminance signal which forms the input image signal.

In addition, the same processing can be realized even if the order of step S12 and step S14 is exchanged.

Figure 15:
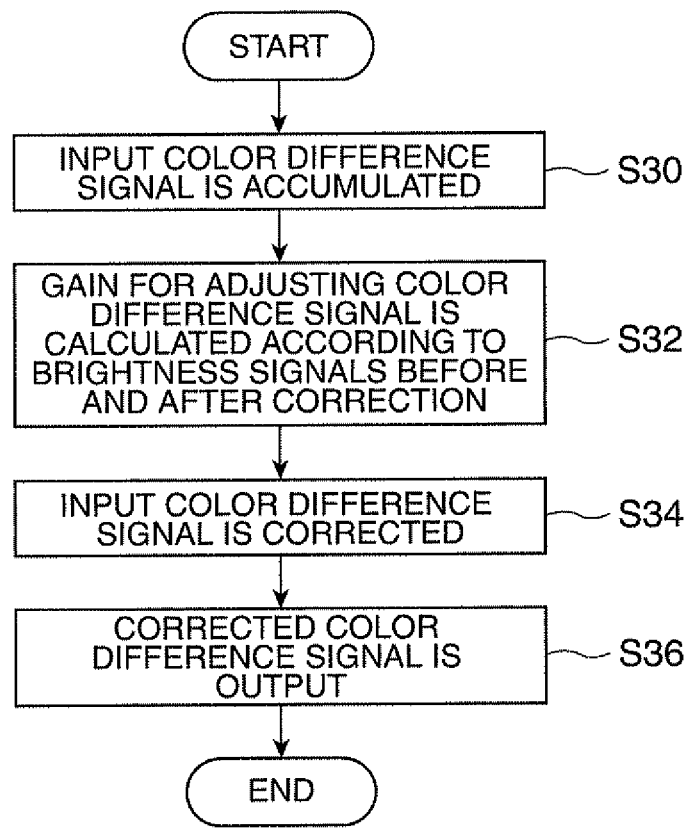
FIG. 15 is a flow chart illustrating an example of correction processing of a color difference signal of the image processing unit in the first embodiment.

FIG. 15 is a flow chart illustrating an example of correction processing of a color difference signal of the image processing unit 30 in the first embodiment. In the case of realizing the processing in FIG. 15 with software, a program for realizing the processing shown in FIG. 15 is stored in the ROM or RAM provided in the image processing unit 30.

First, as an input color difference signal accumulating step (step S30), the image processing unit accumulate a color difference signal (input color difference signal) which forms an input image signal. In this case, the color difference signal is stored in the line memory 32 or the RAM used for realizing the function of the line memory 32.

Then, as a color difference component correction amount calculating step (step S32), the image processing unit 30 calculates the color difference gain coefficient for adjusting the color difference signal according to the luminance signals before and after correction in the correction processing of the luminance signal in FIG. 14. For example, the color difference signal adjusting circuit 82 outputs the color difference gain coefficient gc corresponding to the adjustment parameter designated beforehand and the luminance signals before and after the correction. Or when realizing the above by software processing, the CPU outputs the color difference gain coefficient gc according to the above expression (2) using the adjustment parameter b determined beforehand. Thus, in step S32, the amount of correction of the color difference component of the image signal is calculated such that the value of xy chromaticity does not change before and after correction in the luminance component correcting step.

Then, the image processing unit 30 corrects the color difference signal, which forms the input image signal, using the amount of correction of the color difference component (color difference gain coefficient) calculated in step S32 as a color difference component correcting step (step S34) and outputs the corrected color difference signal (step S36), completing the series of the process (End). That is, in step S34, the color difference signal correcting circuit 90 generates the corrected color difference signal by multiplying the color difference signal which forms the input image signal by the color difference gain coefficient calculated in step S32. Or when realizing the above by software processing, the CPU generates the corrected color difference signal by multiplying the color difference signal which forms the input image signal by the color difference gain coefficient. Thus, in step S34, the color difference component of the image signal is corrected such that the value of xy chromaticity does not change before and after correction in the luminance component correcting step.

The luminance signal Y1 and the color difference signals U1 and V1 corrected by the image processing unit 30 are output to the projection unit 100. The projection unit 100 can modulate the light from the light source on the basis of the luminance signal Y1 and the color difference signals U1 and V1 and project the modulated light onto the screen SCR.

Figure 16:
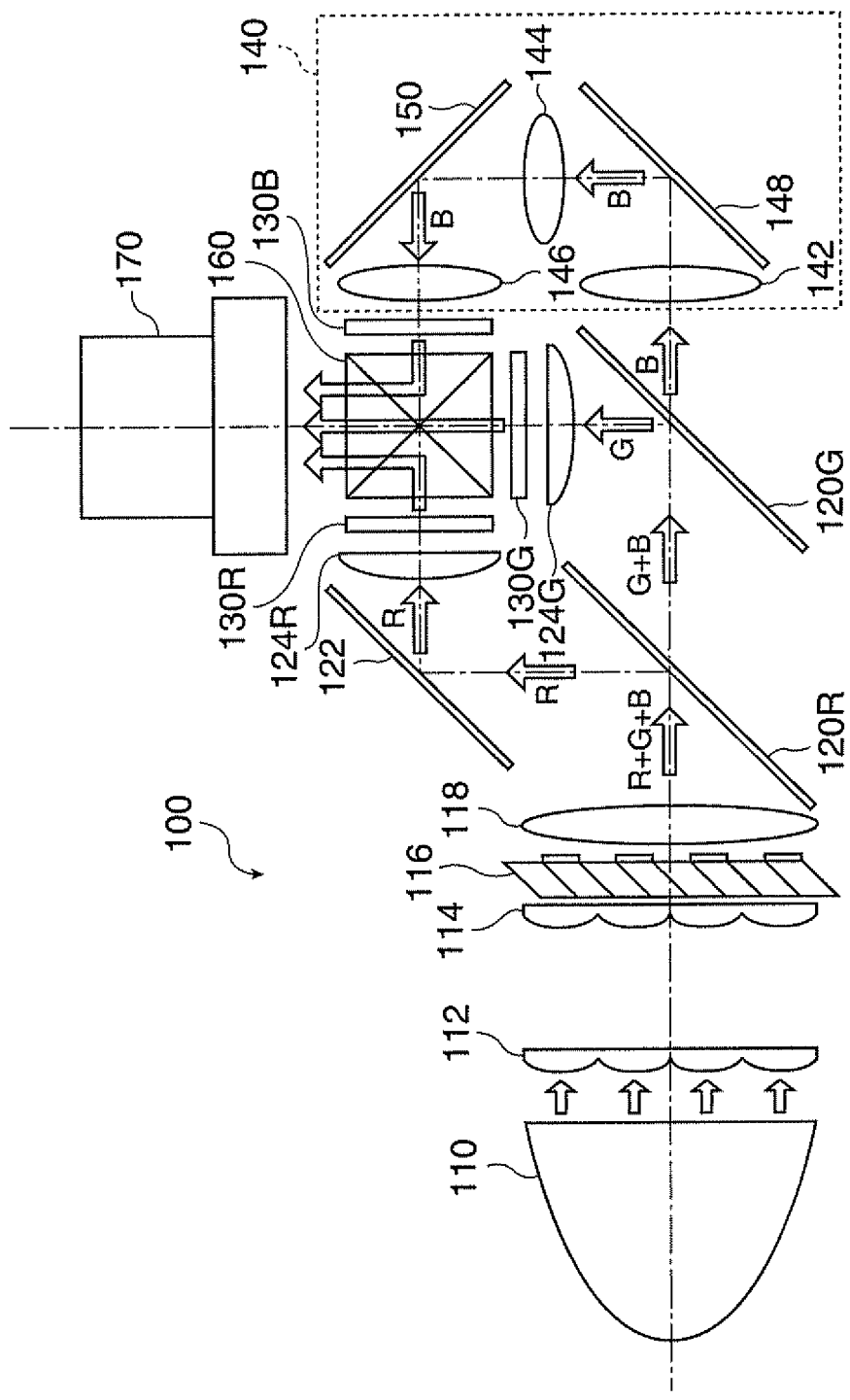
FIG. 16 is a view illustrating an example of the configuration of a projection unit in FIG. 1.

FIG. 16 is a view illustrating an example of the configuration of the projection unit 100 in FIG. 1. In FIG. 16, an explanation is made assuming the projection unit 100 in the first embodiment is formed from a so-called three-plate type liquid crystal projector. However, the projection unit of the image display device of the invention is not limited to being formed from the so-called three-plate type liquid crystal projector. That is, the following explanation will be made assuming that one pixel is formed by an R-component sub-pixel, a G-component sub-pixel, and a B-component sub-pixel. However, the number of sub-pixels (the number of color components) which form one pixel is not limited thereto.

Moreover, in FIG. 16, it is assumed that the luminance signal Y1 and the color difference signals U1 and V1, which are input from the image processing unit 30, are converted into image signals of the respective color components of RGB and then the light from the light source is modulated for every color component. In this case, a circuit for conversion into the RGB signals may be provided in the image processing unit 30 or may be provided in the projection unit 100.

The projection unit 100 in the first embodiment includes a light source 110, integrator lenses 112 and 114, a polarization conversion device 116, a superposition lens 118, a dichroic mirror 120R for R, a dichroic mirror 120G for G, a reflecting mirror 122, a field lens 124R for R, a field lens 1246 for G, a liquid crystal panel 130R (first light modulating device) for R, a liquid crystal panel 130G (second light modulating device) for G, a liquid crystal panel 130B (third light modulating device) for B, a relay optical system 140, a cross dichroic prism 160, and a projection lens 170. Liquid crystal panels used as the liquid crystal panel 130R for R, the liquid crystal panel 130G for G, and the liquid crystal panel 130B for B are transmissive liquid crystal display devices. The relay optical system 140 includes relay lenses 142, 144, and 146 and reflecting mirrors 148 and 150.

The light source 110 is formed from an ultrahigh-pressure mercury lamp, for example, and emits light including at least R-component light, G-component light, and B-component light. The integrator lens 112 has a plurality of small lenses for dividing light from the light source 110 into a plurality of partial light components. The integrator lens 114 has a plurality of small lenses corresponding to the plurality of small lenses of the integrator lens 112. The superposition lens 118 superimposes partial light components emitted from the plurality of small lenses of the integrator lens 112 on the liquid crystal panel.

In addition, the polarization conversion device 116 has a polarizing beam splitter array and a λ/2 plate and converts light from the light source 110 into approximately one kind of polarized light. The polarizing beam splitter array has a structure in which a polarized light separating film, which divides partial light components divided by the integrator lens 112 into p-polarized light and s-polarized light, and a reflecting film, which changes the direction of the light from the polarized light separating film, are alternately arrayed. Polarization directions of two kinds of polarized light components separated by the polarized light separating film are aligned by the λ/2 plate. The light converted into approximately one kind of polarized light by the polarization conversion device 116 is irradiated to the superposition lens 118.

The light from the superposition lens 118 is incident on the dichroic mirror 120R for R. The dichroic mirror 120R for R has a function for reflecting R-component light and allowing G-component light and B-component light to pass through. Light transmitted through the dichroic mirror 120R for R is irradiated to the dichroic mirror 120G for G, and light reflected by the dichroic mirror 120R for R is reflected by the reflecting mirror 122 and is guided to the field lens 124R for R.

The dichroic mirror 120G for G has a function for reflecting G-component light and allowing B-component light to pass through. Light transmitted through the dichroic mirror 120G for G is incident on the relay optical system 140, and light reflected by the dichroic mirror 120G for G is guided to the field lens 124G for G.

In the relay optical system 140, in order to make the difference between the optical path length of the B-component light transmitted through the dichroic mirror 120G for G and the optical path length of the other R-component and G-component light as small as possible, the relay lenses 142, 144, and 146 are used to correct the differences in the optical path lengths. Light transmitted through the relay lens 142 is guided to the relay lens 144 by the reflecting mirror 148. Light transmitted through the relay lens 144 is guided to the relay lens 146 by the reflecting mirror 150. Light transmitted through the relay lens 146 is irradiated to the liquid crystal panel 130B for B.

Light irradiated to the field lens 124R for R is converted into parallel beams to be incident on the liquid crystal panel 130R for R. The liquid crystal panel 130R for R functions as a light modulating device (light modulating section), and the transmittance (passing rate, modulation rate) is set to change on the basis of an image signal for R. Therefore, light (light of a first color component) incident on the liquid crystal panel 130R for R is modulated on the basis of the image signal for R, and the modulated light is incident on the cross dichroic prism 160.

Light irradiated to the field lens 124G for G is converted into parallel beams to be incident on the liquid crystal panel 130G for G. The liquid crystal panel 130G for G functions as a light modulating device (light modulating section), and the transmittance (passing rate, modulation rate) is set to change on the basis of an image signal for G. Therefore, light (light of a second color component) incident on the liquid crystal panel 130G for G is modulated on the basis of the image signal for G, and the modulated light is incident on the cross dichroic prism 160.

The liquid crystal panel 130B for B to which light converted into parallel beams is irradiated by the relay lenses 142, 144, and 146 functions as a light modulating device (light modulating section), and the transmittance (passing rate, modulation rate) is set to change on the basis of an image signal for B. Therefore, light (light of a third color component) incident on the liquid crystal panel 130B for B is modulated on the basis of the image signal for B, and the modulated light is incident on the cross dichroic prism 160.

The liquid crystal panel 130R for R, the liquid crystal panel 130G for G, and the liquid crystal panel 130B for B have the same configuration. Each liquid crystal panel is formed by sealing liquid crystal, which is an electro-optical material, between a pair of transparent glass substrates. In each liquid crystal panel, the passing rate of each color light is modulated corresponding to the image signal of each sub-pixel, for example, using a polysilicon thin film transistor as a switching element.

In the first embodiment, the liquid crystal panel as a light modulating device is provided for every color component which forms one pixel, and the transmittance of each liquid crystal panel is controlled by the image signal corresponding to the sub-pixel. That is, the image signal for an R-component sub-pixel is used to control the transmittance (passing rate, modulation rate) of the liquid crystal panel 130R for R, the image signal for a G-component sub-pixel is used to control the transmittance (passing rate, modulation rate) of the liquid crystal panel 130G for G, and the image signal for a B-component sub-pixel is used to control the transmittance (passing rate, modulation rate) of the liquid crystal panel 130B for B.

The cross dichroic prism 160 has a function of outputting mixed light, in which incident light from the liquid crystal panel 130R for R, the liquid crystal panel 130G for G, and the liquid crystal panel 130B for B is mixed, as emitted light. The projection lens 170 is a lens which forms an output image on the screen SCR in an enlarged manner.

By controlling the projection unit 100 as an image display step after performing the gray level correction processing in the first embodiment so that the image is displayed on the basis of the image signal corrected in the gray level correction processing, an image display method can be provided which is capable of improving the expression of the detail of the image without affecting the other luminance regions.

As described above, in the first embodiment, not only is the luminance signal corrected, but also the color difference signal is corrected simultaneously with the luminance signal. In this case, the luminance signal is corrected according to the environment of use of the projector 20, and the object to be corrected is limited to only a luminance signal in a predetermined luminance level range in a predetermined spatial frequency band.

First Modification of the First Embodiment

In the image processing unit 30 of the first embodiment, the luminance signal correction amount calculating circuit 50 is configured to include the weight calculating circuit 52 and the luminance gain calculating circuit 56 as shown in FIG. 8 and to generate the correction signal VA by the multiplier which performs multiplication of the weight coefficient or the luminance gain coefficient. However, the invention is not limited to the configuration.

Figure 17:
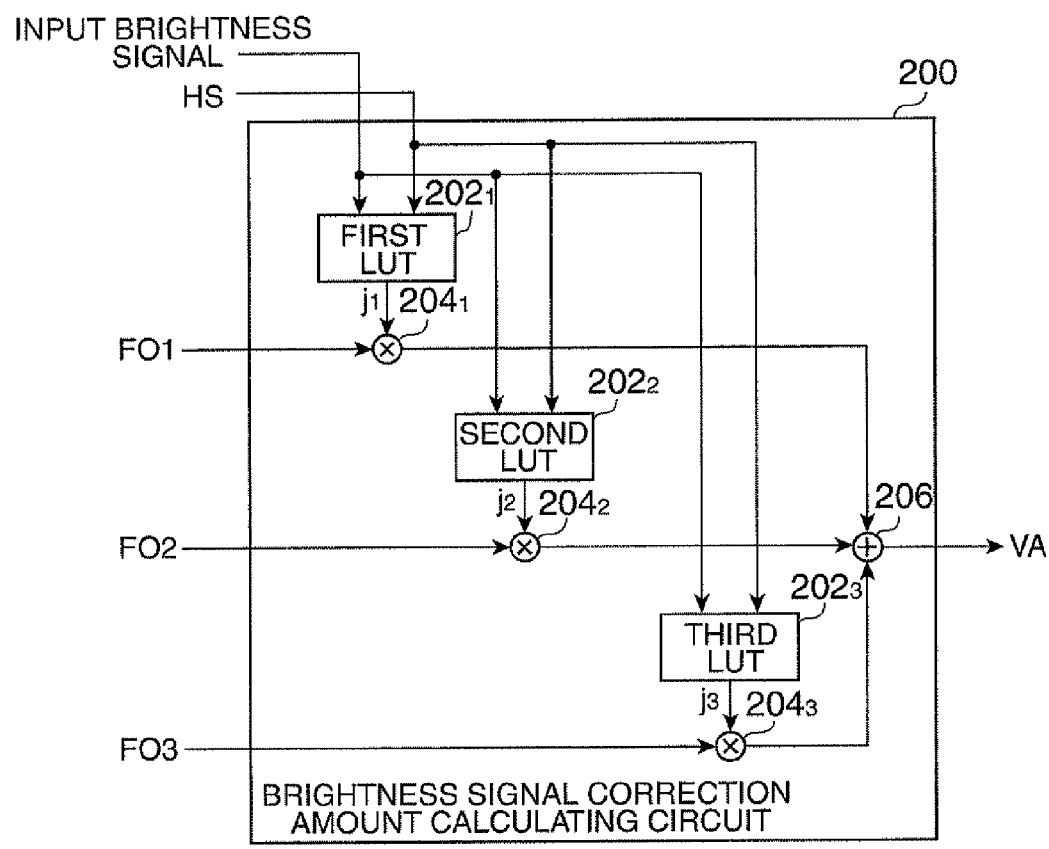
FIG. 17 is a block diagram illustrating an example of the configuration of a luminance signal correction amount calculating circuit in a first modification of the first embodiment.

FIG. 17 is a block diagram illustrating an example of the configuration of the luminance signal correction amount calculating circuit in a first modification of the first embodiment. For example, instead of the luminance signal correction amount calculating circuit 50 in the first embodiment, the luminance signal correction amount calculating circuit shown in FIG. 17 is built in the image processing unit 30 of FIG. 6.

The luminance signal correction amount calculating circuit 200 includes first to third LUTs $202_1$ to $202_3$, multipliers $204_1$ to $204_3$, and an adder 206. The luminance signal correction amount calculating circuit 200 multiplies each output of the multi-stage filter circuit 40 by the luminance gain coefficient from each of the first to third LUTs $202_1$ to $202_3$ and then adds the multiplication results and outputs it as a correction signal VA.

FIGS. 18A to 18C are views for explaining operations of the first to third LUTs $202_1$ to $202_3$ in FIG. 17.

The correction intensity HS calculated by the correction intensity calculating unit 310 and a luminance signal, which forms an input image signal, are input to the first LUT $202_1$, and a luminance gain coefficient $j_1$ corresponding to the luminance signal and the correction intensity HS is output from the first LUT $202_1$. For this reason, luminance gain coefficients $j_1a, j_1b, j_1c, \ldots$ corresponding to the luminance signal and the correction intensity HS are stored beforehand in the first LUT $202_1$, such that the luminance gain coefficient corresponding to the luminance signal and the correction intensity HS is output as the luminance gain coefficient $j_1$ when the luminance signal and the correction intensity HS are input.

The correction intensity HS calculated by the correction intensity calculating unit 310 and a luminance signal, which forms an input image signal, are input to the second LUT $202_2$, and a luminance gain coefficient 12 corresponding to the luminance signal and the correction intensity HS is output from the second LUT $202_2$. For this reason, luminance gain coefficients $j_2a, j_2b, j_2c, \ldots$ corresponding to the luminance signal and the correction intensity HS are stored beforehand in the second LUT $202_2$, such that the luminance gain coefficient corresponding to the luminance signal and the correction intensity HS is output as the luminance gain coefficient $j_2$ when the luminance signal and the correction intensity HS are input.

The correction intensity HS calculated by the correction intensity calculating unit 310 and a luminance signal, which forms an input image signal, are input to the third LUT $202_3$, and a luminance gain coefficient $j_3$ corresponding to the luminance signal and the correction intensity HS is output from the third LUT $202_3$. For this reason, luminance gain coefficients $j_3a, j_2b, j_3c, \ldots$ corresponding to the luminance signal and the correction intensity HS are stored beforehand in the third LUT $202_3$, such that the luminance gain coefficient corresponding to the luminance signal and the correction intensity HS is output as the luminance gain coefficient $j_3$ when the luminance signal and the correction intensity HS are input.

In FIG. 17, the multiplier $204_1$ performs multiplication of an output FO1 of the first filter circuit 42, which forms the multi-stage filter circuit 40, and the luminance gain coefficient $j_1$ from the first LUT $202_1$ and outputs the multiplication result to the adder 206. The multiplier $204_2$ performs multiplication of an output FO2 of the second filter circuit 44, which forms the multi-stage filter circuit 40, and the luminance gain coefficient $j_2$ from the second LUT $202_2$ and outputs the multiplication result to the adder 206. The multiplier $204_3$ performs multiplication of an output FO3 of the third filter circuit 46, which forms the multi-stage filter circuit 40, and the luminance gain coefficient $j_3$ from the third LUT $202_3$ and outputs the multiplication result to the adder 206.

The adder 206 adds the multiplication results of the multipliers $204_1$ to $204_3$ and outputs the addition result as the correction signal VA.

As described above, the image processing unit in the first modification of the first embodiment includes the multi-stage filter circuit 40 which extracts a signal in a predetermined spatial frequency band from the luminance component of an image signal. The luminance signal correction amount calculating circuit 200 includes: a plurality of tables which is provided for every output of the multi-stage filter circuit 40 and outputs a gain corresponding to the correction intensity HS and the level of a luminance component before correction; a plurality of multipliers which is provided for every output of the multi-stage filter circuit 40 and performs multiplication of the output of the multi-stage filter circuit 40 and the output of each of the plurality of tables; and an adder which adds the multiplication results of the plurality of multipliers. The luminance signal correction amount calculating circuit 200 can calculate the output of the adder as the amount of correction of the luminance component. This means that the luminance signal correction amount calculating circuit 200 is provided for every output of the multi-stage filter circuit 40 and has a plurality of tables, which outputs the luminance ratio R and the gain corresponding to the level of a luminance component before correction since the correction intensity HS corresponds to the luminance ratio R.

In the first modification of the first embodiment, similar to the first embodiment, only a luminance signal in a predetermined luminance level range can be corrected according to the environment of use of the projector 20 in a predetermined spatial frequency band and not only can the luminance signal be corrected, but also the color difference signal can be corrected simultaneously with the luminance signal. As a result, since it is possible to avoid the situation where the chromaticity of each pixel changes according to the amount of correction of the luminance signal and the tendency of the overall colors on the screen accordingly changes, the tendency of the colors on the whole screen can be maintained when expressing the detail of the image.

In addition, according to the first modification of the first embodiment, the number of multipliers provided in the luminance signal correction amount calculating circuit can be reduced compared with that in the first embodiment. As a result, it becomes possible to reduce power consumption and cost.

Second Modification of the First Embodiment

The luminance signal correction amount calculating circuit 200 in the first modification of the first embodiment is configured to include the first to third LUTs $202_1$ to $202_3$, the multipliers $204_1$ to $204_3$, and the adder 206 and to add the multiplication results of the multipliers using the luminance gain coefficients from the first to third LUTs $202_1$ to $202_3$, as shown in FIG. 17. However, the invention is not limited to the configuration.

Figure 19:
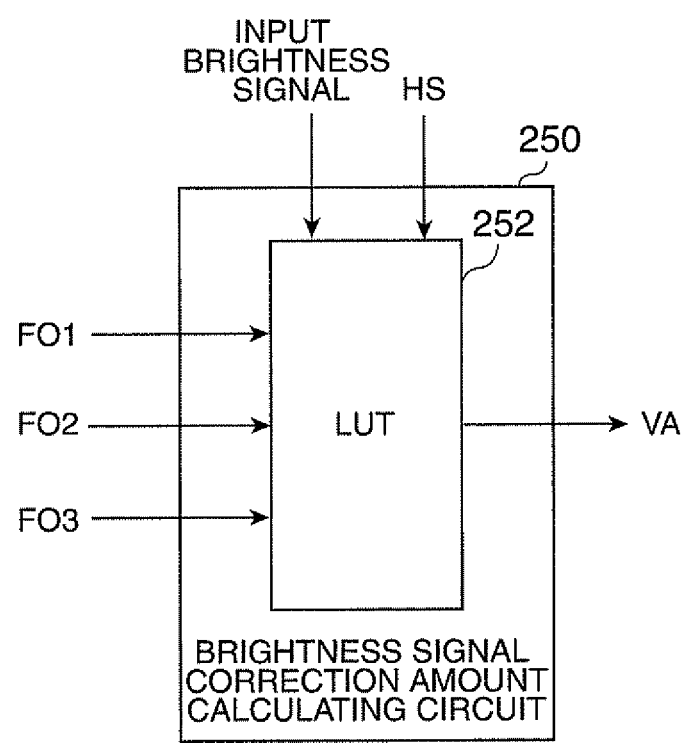
FIG. 19 is a block diagram illustrating an example of the configuration of a luminance signal correction amount calculating circuit in a second modification of the first embodiment.

FIG. 19 is a block diagram illustrating an example of the configuration of a luminance signal correction amount calculating circuit in a second modification of the first embodiment. For example, instead of the luminance signal correction amount calculating circuit 50 in the first embodiment, a luminance signal correction amount calculating circuit 250 shown in FIG. 19 is built in the image processing unit 30 in FIG. 6.

The luminance signal correction amount calculating circuit 250 includes a LUT 252. The luminance signal correction amount calculating circuit 250 outputs the output from the LUT 252 as a correction signal VA.

FIG. 20 is a view for explaining an operation of the LUT252 in FIG. 19.

A correction intensity HS calculated by the correction intensity calculating unit 310 and a luminance signal, which forms an input image signal, and outputs FO1 to FO3 of the first to third filter circuits 42 to 44, which form the multi-stage filter circuit 40, are input to the LUT 252, and the amount of correction corresponding to the combination of the correction intensity HS, the luminance signal and the outputs of the filter circuits is output from the LUT 252. This amount of correction is output as the correction signal VA. For this reason, the amounts of correction VAa, VAb, . . . , VAc, VAd, . . . , VAe, VAf, . . . corresponding to the combination of the correction intensity HS, the luminance signal, and the outputs FO1 to FO3 of the filter circuits are stored beforehand in the LUT 252, such that the amount of correction corresponding to the combination is output when the correction intensity HS, the luminance signal, and the outputs of the filter circuits are input.

As described above, the image processing unit in the second modification of the first embodiment may include the multi-stage filter circuit (in a broad sense, a signal extracting circuit) 40 which extracts a signal in the predetermined spatial frequency band from the luminance component of the image signal, and the luminance signal correction amount calculating circuit 250 may include a table which outputs the amount of correction of the luminance component corresponding to the output of the multi-stage filter circuit 40, the correction intensity HS, and the level of the luminance component before correction. This means that the luminance signal correction amount calculating circuit 250 includes a table which outputs the amount of correction of the luminance component corresponding to the output of the multi-stage filter circuit 40, the luminance ratio R, and the level of the luminance component before correction since the correction intensity HS corresponds to the luminance ratio R. In addition, the amount of correction output from the table is output as the correction signal VA.

In the second modification of the first embodiment, similar to the first embodiment or the first modification of the first embodiment, only a luminance signal in a predetermined luminance level range can be corrected according to the environment of use of the projector 20 in a predetermined spatial frequency band and not only can the luminance signal be corrected, but also the color difference signal can be corrected simultaneously with the luminance signal. As a result, since it is possible to avoid the situation where the chromaticity of each pixel changes according to the amount of correction of the luminance signal and the tendency of the overall colors on the screen accordingly changes, the tendency of the colors on the whole screen can be maintained when expressing the detail of the image.

In addition, according to the second modification of first embodiment, the multipliers and the adder provided in the luminance signal correction amount calculating circuit can be removed compared with the first embodiment or the first modification of first embodiment. As a result, it becomes possible to significantly reduce power consumption and cost.

Second Embodiment

In the first embodiment or the modifications of the first embodiment, the gray level correction processing was performed on the input luminance signal without distinguishing the detail of an image from luminance noise. However, the invention is not limited to this. In a second embodiment of the invention, the correction intensity of the gray level is changed according to a high frequency component of a luminance component of an input image signal, such that the gray level correction processing on the input luminance signal is performed in a state where the detail of an image and luminance noise are distinguished from each other.

The image processing unit 400 in the second embodiment is provided in the projector 20, which includes the sensor 300 and the correction intensity calculating unit 310, instead of the image processing unit 30 in FIG. 1. When performing the same gray level correction processing as in the first embodiment as shown in FIG. 2, the image processing unit 400 calculates a gain coefficient f (frequency gain coefficient. In a broad sense, a frequency gain; the same hereinbelow) by a frequency gain calculating unit (not shown) in consideration of the amount of luminance noise included in the luminance component of the image signal of the input image IMGin and multiplies the gain coefficient f by the signal $gY_H$ to distinguish the detail of the dark portion from the luminance noise, so that only the detail of the dark portion of the display image is highlighted.

Figure 21:
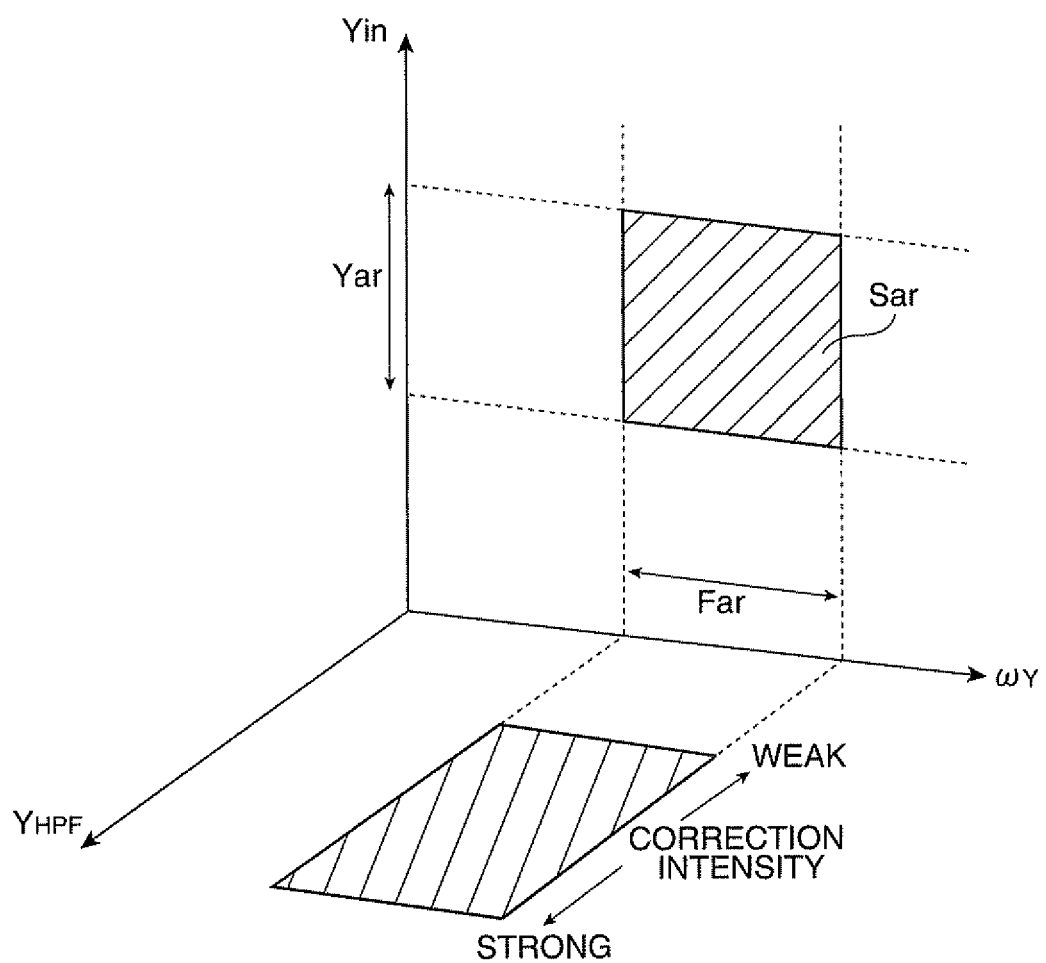
FIG. 21 is a view for explaining an operation of an image processing unit in a second embodiment.

FIG. 21 is a view for explaining an operation of the image processing unit 400 in the second embodiment. FIG. 21 schematically shows a luminance component of an input image signal, a spatial frequency of the luminance component, and a signal $Y_{HPF}$ with a high frequency component of the luminance component at the three-dimensional coordinate system.

The image processing unit 400 in the second embodiment analyzes a spatial frequency of a luminance component of an image signal, calculates the amount of correction of the luminance component of the image signal according to the analysis result of the spatial frequency of the luminance component of the image signal and the luminance ratio (or the correction intensity), which corresponds to the environment of use of the projector, only in a spatial frequency band Far (predetermined spatial frequency band), and corrects the luminance component of the image signal using the amount of correction. More specifically, the image processing unit 400 performs the gray level correction of a signal in a predetermined level range Yar (range Sar in FIG. 21) of the luminance signal Yin of the input image signal, which has been calculated by the luminance gain calculating unit G1, in the spatial frequency band Far of the luminance component of the image signal extracted by the signal extracting unit L1. In this case, the degree of gray level correction is made to change according to a high frequency component of a luminance component of an input image signal and the luminance ratio (or the correction intensity) corresponding to the environment of use of the projector. For example, assuming that a projector is used under the same environment, when there are many high frequency components in the luminance component, it is determined that there are many desired signal components and there is little luminance noise, the degree of correction is intensified. In addition, when there are few high frequency components in the luminance component, it is determined that there are few desired signal components and there is substantial luminance noise, the degree of correction is weakened. As a result, the luminance component can be changed only in the spatial frequency band Far extracted by the signal extracting unit L1 and the predetermined level range Yar of the luminance signal Yin which forms the input image signal calculated by the luminance gain calculating unit G1 without highlighting the luminance noise of the image and changing the tendency of the overall luminance.

Since the spatial frequency band extracted by the signal extracting unit L1, the level range of the luminance component where the gain coefficient g is calculated by the luminance gain calculating unit G1, the high frequency band of the luminance component, or the degree of correction can each be designated, the change in luminance of the input image signal can be increased according to the amount of luminance noise only in the designated level range of the luminance component of the designated spatial frequency band. Accordingly, for example, by increasing the luminance gain coefficient for a luminance component with low luminance, which is a dark portion, in the luminance gain calculating unit G1, the detail of the dark portion can be expressed without reducing the luminance range of other gray levels.

In addition, the whole screen is not uniformly corrected. Accordingly, even in the case where dark and bright portions are mixed, the details of both the dark and bright portions can be expressed without uniformly increasing the luminance of the dark portion or uniformly decreasing the luminance of the bright portion. For example, in the case shown in FIG. 21, the correction is performed from the middle frequency band to the high frequency band of the luminance of the input image signal. Accordingly, the detail only can be highlighted without changing the overall brightness of the input image. Furthermore, since the detail of the dark portion of the image and the luminance noise can be distinguished from each other, it is possible to avoid the situation where the luminance noise is highlighted together with the detail of the dark portion.

Hereinafter, examples of the configuration and processing of the projector in the second embodiment for realizing such gray level correction will be described. The same sections as in the projector 20 in first embodiment are denoted by the same reference numerals, and the explanation will be appropriately omitted.

Figure 22:
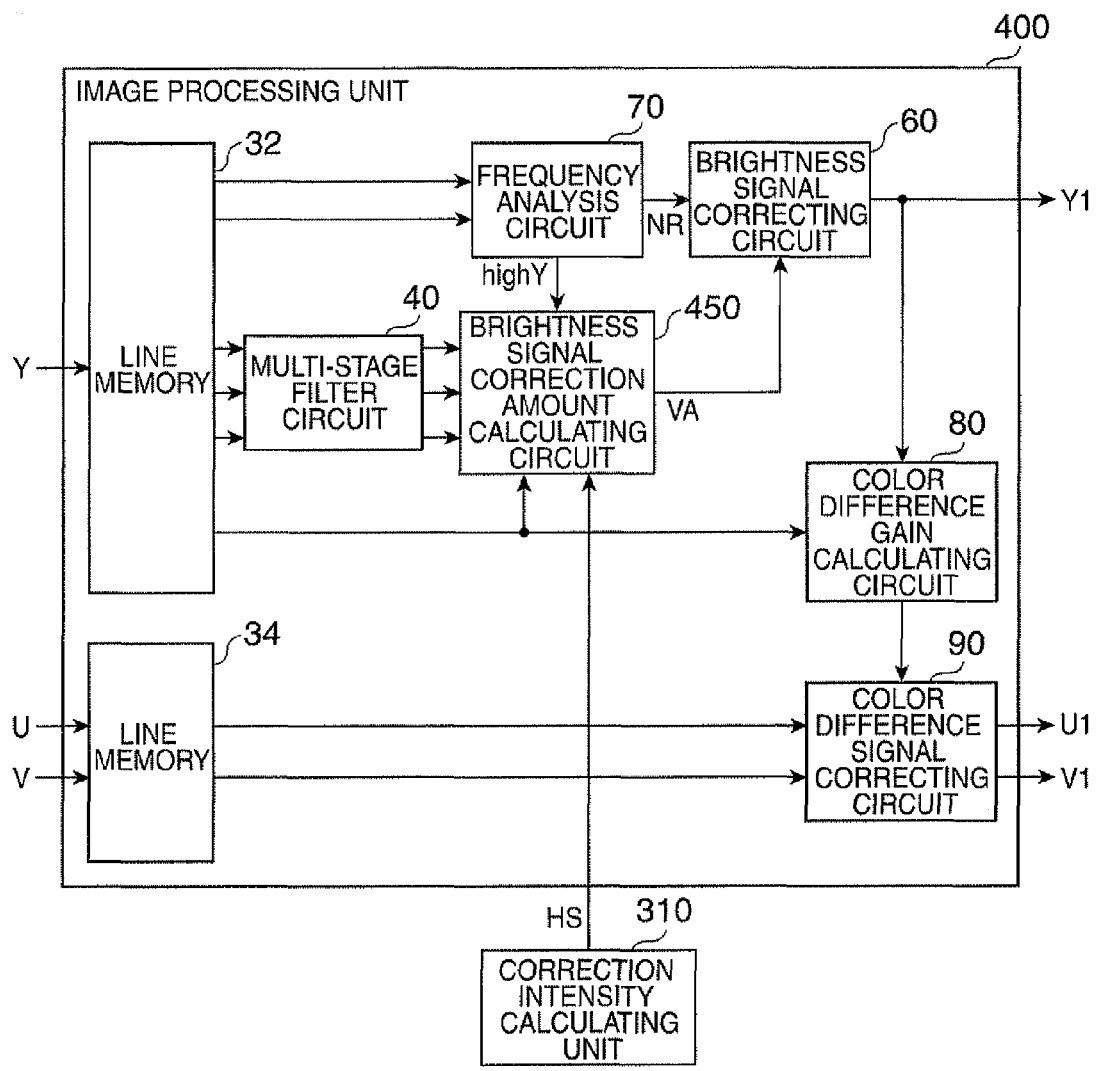
FIG. 22 is a block diagram illustrating an example of the hardware configuration of the image processing unit in the second embodiment.

FIG. 22 is a block diagram illustrating an example of the hardware configuration of the image processing unit 400 in the second embodiment. In FIG. 22, the same sections as in FIG. 6 are denoted by the same reference numerals, and the explanation will be appropriately omitted. In FIG. 22, the correction intensity calculating unit 310 provided outside the image processing unit 400 is shown together.

The image processing unit 400 in FIG. 22 is different from the image processing unit 30 in FIG. 6 in that a frequency analysis circuit (frequency analysis section) 70, which functions as a high frequency component extracting circuit or a luminance noise removing circuit, is added to the image processing unit 400 and a luminance signal correction amount calculating circuit 450 is provided instead of the luminance signal correction amount calculating circuit 50.

The frequency analysis circuit 70 analyzes the spatial frequency of the luminance signal stored in the line memory 32. More specifically, the frequency analysis circuit 70 can remove luminance noise from the luminance signal from the line memory 32 while extracting the high frequency component of the luminance signal. The output highY, which is the absolute value of the high frequency component of the luminance signal extracted by the frequency analysis circuit 70, is supplied to the luminance signal correction amount calculating circuit 450 as the analysis result of the frequency analysis circuit 70. The luminance signal from which the luminance noise has been removed by the frequency analysis circuit 70 is supplied to the luminance signal correcting circuit 60 as a luminance signal NR.

The luminance signal correction amount calculating circuit 450 calculates the correction signal VA corresponding to the amount of correction of the luminance signal on the basis of the output of the multi-stage filter circuit 40, the luminance signal stored in the line memory 32, the analysis result of the frequency analysis circuit 70, and the correction intensity HS from the correction intensity calculating unit 310. According to the output highY and the correction intensity HS (or the luminance ratio R), the luminance signal correction amount calculating circuit 450 can calculate the amount of correction for the luminance signal in a predetermined luminance level range of the luminance signals in the predetermined spatial frequency band extracted by the multi-stage filter circuit 40.

Here, the output highY is a signal corresponding to the luminance noise or detail of dark portions of the input image. That is, when used under the same environment, according to the level of the output highY, the luminance signal correction amount calculating circuit 450 can generate the amount of correction such that the degree of correction becomes intensified when it is determined that the amount of luminance noise is small and the degree of correction becomes weakened when it is determined that the amount of luminance noise is large. The luminance signal correction amount calculating circuit 450 can realize a function of the luminance gain calculating unit G1 in FIG. 2 or a frequency gain calculating unit (not shown).

The luminance signal correcting circuit 60 corrects the luminance signal NR, from which the luminance noise has been removed by the frequency analysis circuit 70, by using the correction signal VA calculated by the luminance signal correction amount calculating circuit 450 and outputs it as a corrected luminance signal Y1.

Thus, the image processing unit 400 can correct the luminance signal according to the correction intensity HS and the analysis result of the spatial frequency of the luminance signal of the input image only for luminance signals with a predetermined luminance level in a predetermined spatial frequency band. In addition, the image processing unit 400 can correct a color difference signal according to the amount of correction of the luminance signal simultaneously with the correction of the luminance signal.

Next, since the other blocks are the same as those corresponding to the image processing unit 30, the frequency analysis circuit 70 and the luminance signal correction amount calculating circuit 450 which are unique blocks in the image processing unit 400 will be described.

Figure 23:
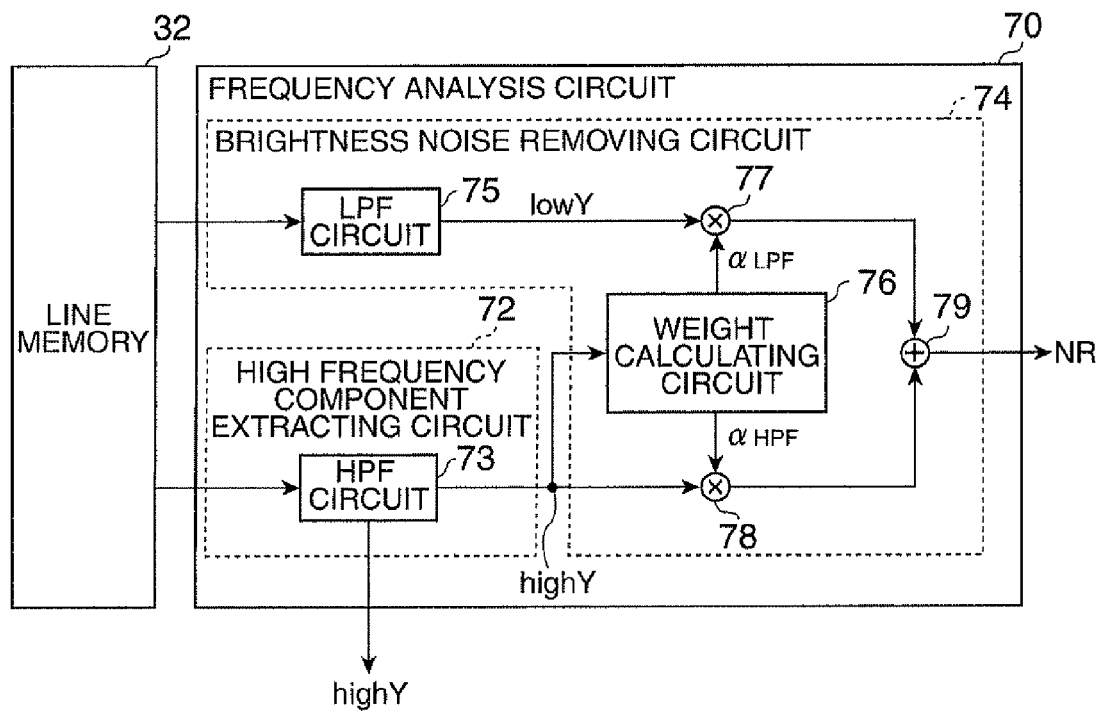
FIG. 23 is a block diagram illustrating an example of the configuration of a frequency analysis circuit in FIG. 22.

FIG. 23 is a block diagram illustrating an example of the configuration of the frequency analysis circuit 70 in FIG. 22.

In FIG. 23, the same sections as in FIG. 22 are denoted by the same reference numerals, and the explanation will be appropriately omitted.

The frequency analysis circuit 70 includes a high frequency component extracting circuit (high frequency component extracting section) 72 and a luminance noise removing circuit (luminance noise removing section) 74. The high frequency component extracting circuit 72 extracts a predetermined high frequency component, in which the detail of a dark portion of an image and luminance noise are included, from the luminance signal accumulated in the line memory and outputs the absolute value as the output highY. The luminance noise removing circuit 74 generates the luminance signal NR, from which the luminance noise has been removed, from the luminance signal accumulated in the line memory 32. Here, the luminance noise removing circuit 74 generates the luminance signal NR using the high frequency component extracted by the high frequency component extracting circuit 72.

The high frequency component extracting circuit includes an HPF (high pass filter) circuit 73. A luminance signal from the line memory 32 is input to the HPF circuit 73, and the HPF circuit 73 outputs the absolute value of the high frequency component of the luminance signal as the output highY to the luminance signal correction amount calculating circuit 50 or the luminance noise removing circuit 74. The HPF circuit 73 outputs the output highY as the absolute value of the high frequency component by the known HPF processing according to the following expression.

$$highY = \sum_{(u,v) \subset F} a_{HPF}(u,v) Y(x+u, y+v) \left( -\frac{s-1}{2} \le u, v \le \frac{s-1}{2} \right) \quad (3)$$

Here, highY is the output of the HPF circuit 73, Y is an input luminance signal, (x, y) are the coordinates of an object pixel, $a_{HPF}$ is a filter coefficient, (u, v) are within the above range in the relative coordinate system having the object pixel as the center, and s is the filter size. s may be set to '3', for example. However, s may be set to a different number other than '3'.

The luminance noise removing circuit 74 includes an LPF (low pass filter) circuit 75, a weight calculating circuit 76, multipliers 77 and 78, and an adder 79. A luminance signal from the line memory 32 is input to the LPF circuit 75, and a low frequency component of the luminance signal passes through the LPF circuit 75. Such an LPF circuit 75 outputs the output lowY by the known LPF processing according to the following expression.

$$lowY = \sum_{(u,v) \subset F} a_{LPF}(u,v) Y(x+u, y+v) \left( -\frac{s-1}{2} \le u, v \le \frac{s-1}{2} \right) \quad (4)$$

Here, lowY is the output of the LPF circuit 75, Y is an input luminance signal, (x, y) are the coordinates of an object pixel, $a_{LPF}$ is a filter coefficient, (u, v) are within the above range in the relative coordinate system having the object pixel as the center, and s is the filter size. s may be set to '5', for example. However, s may be set to a different number other than '5' and is preferably larger than the filter size of the HPF circuit 73.

Figure 24:
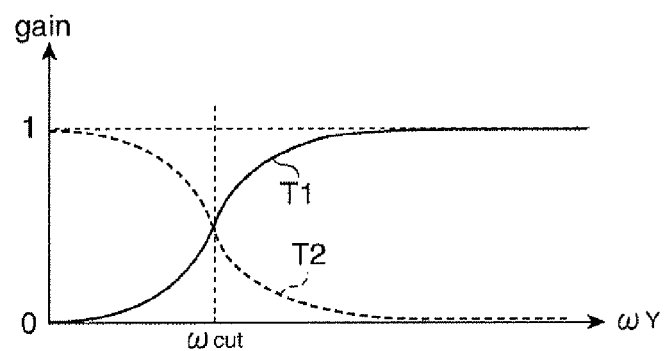
FIG. 24 is a view illustrating an example of the filter characteristics of an HPF circuit and an LPF circuit in FIG. 23.

FIG. 24 is a view illustrating an example of the filter characteristics of the HPF circuit 73 and the LPF circuit 75 in FIG. 23. In FIG. 24, the horizontal axis indicates a frequency of a luminance signal, and the vertical axis indicates the gain.

The output of the HPF circuit 73 is decreased in a region where the spatial frequency of the luminance signal is low and is increased in a region where the spatial frequency of the luminance signal is high (T1 in FIG. 24). The cut-off frequency of the HPF circuit 73 is $\omega_{HPF}$. On the other hand, the output of the LPF circuit 75 is increased in a region where the spatial frequency of the luminance signal is low and is decreased in a region where the spatial frequency of the luminance signal is high (T2 in FIG. 24). The cut-off frequency of the LPF circuit 75 is $\omega_{LPF}$. Here, it is preferable that the cut-off frequency of the HPF circuit 73 and the cut-off frequency of the LPF circuit 75 be equal $\omega_{HPF} = \omega_{LPF} = \omega_{cut}$). Thus, the luminance signal can be corrected without omitting the information of the original luminance signal.

In FIG. 23, the weight calculating circuit 76 calculates the amount of weighting according to the output from the high frequency component extracting circuit 72. The weight calculating circuit 76 stores the amount of weighting corresponding to the output highY of the HPF circuit 73 in the form of an LUT, such that the value corresponding to the output from the HPF circuit 73 can be read or a plurality of values corresponding to the output from the HPF circuit 73 can be interpolated and output.

Figures 25, 26:
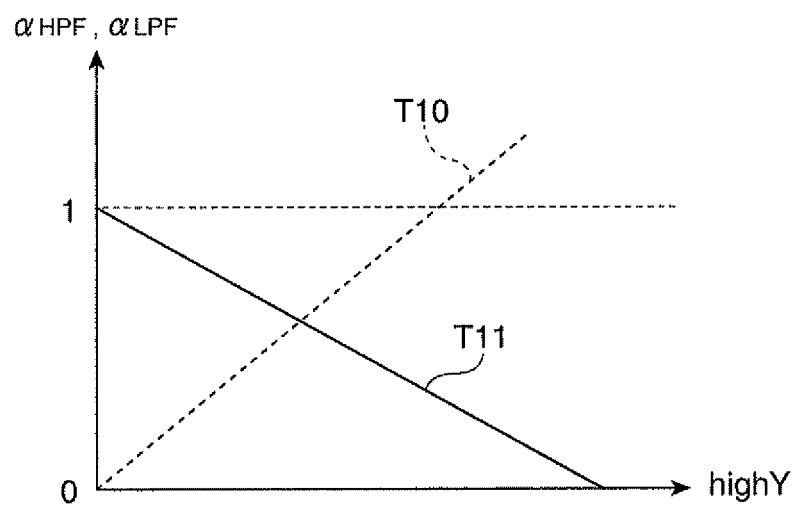
FIG. 25 is a view for explaining an operation of a weight calculating circuit.
FIG. 26 is a view for explaining weight coefficients output from the weight calculating circuit.

FIG. 25 is a view for explaining an operation of the weight calculating circuit 76.

According to the output of the HPF circuit 73, the weight calculating circuit 76 outputs a weight coefficient $\alpha_{LPF}$ to the multiplier 77 and outputs a weight coefficient $\alpha_{HPF}$ to the multiplier 78. More specifically, the weight calculating circuit 76 stores the weight coefficients $\alpha_{HPF}$ and $\alpha_{LPF}$ corresponding to the output from the HPF circuit 73 in the form of an LUT beforehand. That is, weight coefficients ($\alpha_{HPF}$a, $\alpha_{LPF}$a), ($\alpha_{HPF}$b, $\alpha_{LPF}$b), ($\alpha_{HPF}$c, $\alpha_{LPF}$c), . . . which correspond to the output of the HPF circuit 73 are stored beforehand in the weight calculating circuit 76, such that the weight coefficients $\alpha_{HPF}$ and $\alpha_{LPF}$ corresponding to the output highY are output when the output highY of the HPF circuit 73 is input.

FIG. 26 is a view for explaining the weight coefficients $\alpha_{HPF}$ and $\alpha_{LPF}$ output from the weight calculating circuit 76. In FIG. 26, the horizontal axis indicates the output of the HPF circuit 73, and the vertical axis indicates the weight coefficients $\alpha_{HPF}$ and $\alpha_{LPF}$ as the amount of weighting output from the weight calculating circuit 76.

In the weight calculating circuit 76, the weight coefficient $\alpha_{HPF}$ whose value increases as the output highY of the HPF circuit 73 increases is stored (T10 in FIG. 26), and the weight coefficient $\alpha_{LPF}$ whose value decreases as the output highY of the HPF circuit 73 increases is stored (T11 in FIG. 26). In addition, although the weight coefficients $\alpha_{HPF}$ and $\alpha_{LPF}$ increase or decrease linearly according to the output highY of the HPF circuit in FIG. 26, the weight coefficients $\alpha_{HPF}$ and $\alpha_{LPF}$ may increase or decrease according to a predetermined function.

In FIG. 23, the multiplier 77 outputs to the adder 79 a result of the multiplication of the output of the LPF circuit 75 and the weight coefficient $\alpha_{LPF}$ from the weight calculating circuit 76. The multiplier 78 outputs to the adder 79 a result of the multiplication of the output of the HPF circuit 73 and the weight coefficient $\alpha_{HPF}$ from the weight calculating circuit 76. The adder 79 adds the multiplication result of the multiplier 77 and the multiplication result of the multiplier 78 and outputs it as the luminance signal NR after removing the luminance noise. That is, the luminance noise removing circuit 74 outputs the luminance signal NR according to the following expression.

$$NR = \alpha_{HPF} \cdot highY + \alpha_{LPF} \cdot lowY \quad (5)$$

In the above expression, highY is the output of the HPF circuit 73 and lowY is the output of the LPF circuit 75.

Since the weight calculating circuit 76 outputs the weight coefficients $\alpha_{HPF}$ and $\alpha_{LPF}$ as shown in FIG. 26, the luminance signal NR becomes a signal from which a high-frequency luminance noise has been removed. That is, since a region where the output highY of the HPF circuit 73 is small mainly corresponds to a luminance signal distributed over a low frequency band, the desired luminance signal NR can be acquired without highlighting the luminance noise by decreasing the weight coefficient other hand, since a region where the output highY of the HPF circuit 73 is large mainly corresponds to a luminance signal distributed over a high frequency band, the desired luminance signal NR can be acquired by increasing the weight coefficient $\alpha_{HPF}$ and decreasing the weight coefficient $\alpha_{LPF}$ to maintain or highlight the edge information.

In addition, it was described that the frequency analysis circuit 70 was configured to include the high frequency component extracting circuit 72 and the luminance noise removing circuit 74 in FIG. 23. However, the frequency analysis circuit 70 may be configured to include only the high frequency component extracting circuit 72 so that a luminance signal accumulated in the line memory 32 is supplied to the luminance signal correcting circuit 60 as the luminance signal NR as it is.

Figures 27, 28:
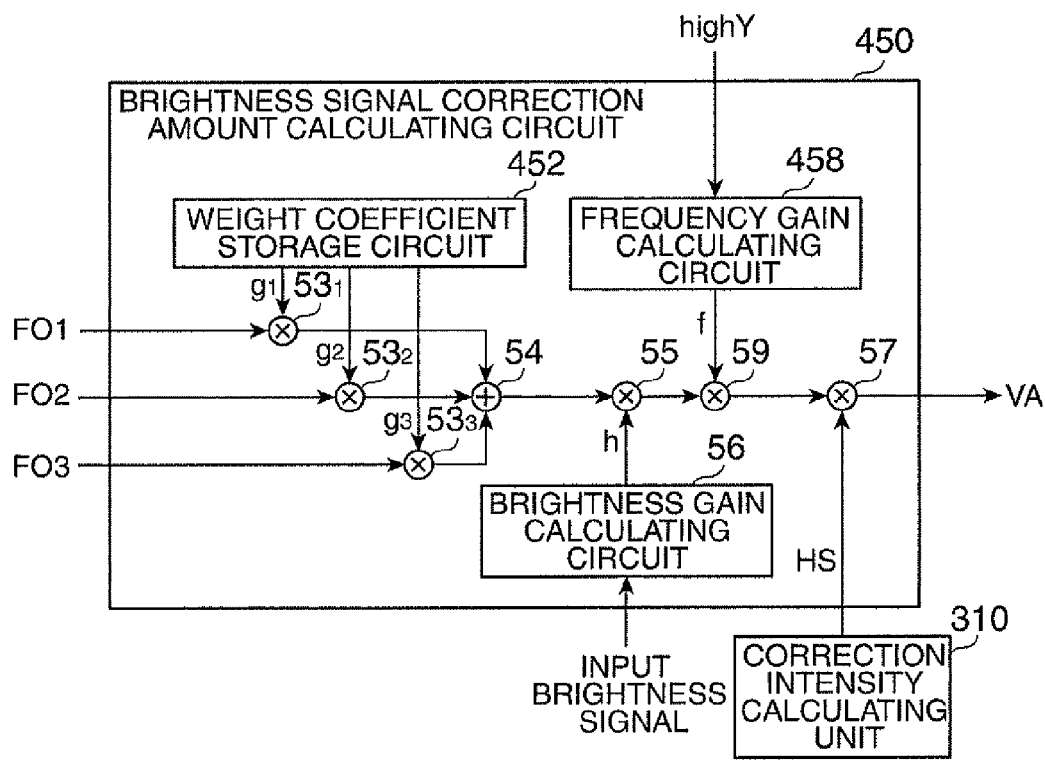
FIG. 27 is a block diagram illustrating an example of the configuration of a luminance signal correction amount calculating circuit in FIG. 22.
FIG. 28 is a view for explaining an operation of a frequency gain calculating circuit in FIG. 27.

FIG. 27 is a block diagram illustrating an example of the configuration of the luminance signal correction amount calculating circuit 450 in FIG. 22. In FIG. 27, the same sections as in FIG. 8 or 22 are denoted by the same reference numerals, and the explanation will be appropriately omitted. In FIG. 27, the correction intensity calculating unit 310 provided outside the image processing unit is shown together.

FIG. 28 is a view for explaining an operation of the frequency gain calculating circuit in FIG. 27.

The luminance signal correction amount calculating circuit 450 includes a weight coefficient storage circuit 452, multipliers 53₁ to 53₃, an adder 54, a multiplier 55, a luminance gain calculating circuit (luminance gain calculating section) 56, a frequency gain calculating circuit (frequency gain calculating section) 458, and multipliers 57 and 59. The luminance signal correction amount calculating circuit 450 is different from the luminance signal correction amount calculating circuit 50 shown in FIG. 8 in that the weight coefficient storage circuit 452 is provided instead of the weight calculating circuit 52, the frequency gain calculating circuit 458 and the multiplier 59 are added, and the correction signal VA in which the frequency gain coefficient f is considered is generated.

In such a luminance signal correction amount calculating circuit 450, the weight coefficient storage circuit 452 stores weight coefficients $g_1$ to $g_3$ which are constant values decided beforehand. The weight coefficient $g_1$ is input to the multiplier 53₁ to which the output FO1 of the first filter circuit 42 is input. The multiplier 53₁ outputs a result, which is obtained by multiplying the output FO1 of the first filter circuit 42 by the weight coefficient $g_1$, to the adder 54.

The weight coefficient $g_2$ is input to the multiplier 53₂ to which the output FO2 of the second filter circuit 44 is input. The multiplier 53₂ outputs a result, which is obtained by multiplying the output FO2 of the second filter circuit 44 by the weight coefficient $g_2$, to the adder 54.

The weight coefficient $g_3$ is input to the multiplier 53₃ to which the output FO3 of the third filter circuit 46 is input. The multiplier 53₃ outputs a result, which is obtained by multi-plying the output FO3 of the third filter circuit 46 by the weight coefficient $g_3$, to the adder 54.

The adder 54 adds the multiplication results of the multipliers 53₁ to 53₃ and outputs the addition result to the multiplier 55. The luminance gain coefficient h calculated by the luminance gain calculating circuit 56 is input to the multiplier 55.

The frequency gain coefficient f calculated by the frequency gain calculating circuit 458 is input to the multiplier 59 to which the multiplication result of the multiplier 55 is input. The output highY from the HPF circuit 73 in FIG. 23 is input to the frequency gain calculating circuit 458. Then, the frequency gain calculating circuit 458 calculates the frequency gain coefficient f (frequency gain) corresponding to the level of the output highY of the HPF circuit 73, as shown in FIG. 28.

Such a frequency gain calculating circuit 458 is realized by the LUT which has the output highY of the HPF circuit 73 as the input and has the frequency gain coefficient f as the output. For this reason, frequency gain coefficients fa, fb, fc, . . . which correspond to the output highY are stored beforehand in the frequency gain calculating circuit 458, such that the frequency gain coefficient corresponding to the output highY is output when the output highY from the HPF circuit 73 is input. Since the frequency gain coefficient corresponding to the desired output highY can be designated in the frequency gain calculating circuit 458, the amount of correction can be generated only for the designated high frequency band.

The multiplier 59 multiplies the multiplication result of the multiplier 55 by the frequency gain coefficient f from the frequency gain calculating circuit 458. The multiplication result of the multiplier 59 is input to the multiplier 57. The correction intensity HS calculated by the correction intensity calculating unit 310 is input to the multiplier 57, similar to the first embodiment. The multiplier 57 outputs the correction signal VA corresponding to the amount of correction of the luminance signal by multiplying the multiplication result of the multiplier 59 by the correction intensity HS. The correction signal VA is input to the luminance signal correcting circuit 60.

Thus, the luminance signal correction amount calculating circuit 450 can calculate the amount of correction of the luminance signal on the basis of the signal in the predetermined spatial frequency band extracted by the multi-stage filter circuit 40 (in a broad sense, a signal extracting circuit), the luminance gain coefficient calculated by the luminance gain calculating circuit 56, the frequency gain coefficient calculated by the frequency gain calculating circuit 58, and the correction intensity HS (or the luminance ratio R) from the correction intensity calculating unit 310 corresponding to the environment of use of the projector 20. In addition, the luminance signal correcting circuit outputs the corrected luminance signal Y1 by adding the correction signal VA from the luminance signal correction amount calculating circuit 450 to the luminance signal which forms the input image signal or the luminance signal from which the luminance noise component has been removed, for example. Accordingly, since the correction can be performed only when there is a small amount of luminance noise, it is possible to prevent the luminance noise from being amplified by the correction.

In addition, without calculating the luminance gain coefficient, the luminance signal correction amount calculating circuit 450 may calculate the amount of correction of the luminance signal on the basis of the luminance component in the predetermined luminance level range in the predetermined spatial frequency band extracted by the multi-stage filter circuit 40 (in a broad sense, a signal extracting circuit), the frequency gain coefficient calculated by the frequency gain calculating circuit 58, and the correction intensity HS (or the luminance ratio R) from the correction intensity calculating unit 310 corresponding to the environment of use of the projector 20.

In addition, in the second embodiment, the correction processing of a color difference signal which corresponds to the amount of correction of the luminance signal and which is performed simultaneously with the correction of the luminance signal can be performed in the same manner as in the first embodiment. Therefore, the explanation will be omitted. Accordingly, the image processing unit 400 can correct not only the luminance signal but also the color difference signal simultaneously with the luminance signal. As a result, since it is possible to avoid the situation where the chromaticity of each pixel changes according to the amount of correction of the luminance signal and the tendency of the overall colors on the screen accordingly changes, the tendency of the colors on the whole screen can be maintained when expressing the detail of the image.

The processing of the image processing unit 400 in the second embodiment may also be realized by software processing. In this case, the image processing unit 400 includes a CPU, a ROM, and a RAM. The image processing unit 400 performs correction processing of the luminance component and the color difference component by controlling the hardware, such as the multiplier and the adder, by making the CPU, which has read a program stored in the ROM or RAM, execute processing corresponding to the program.

Figure 29:
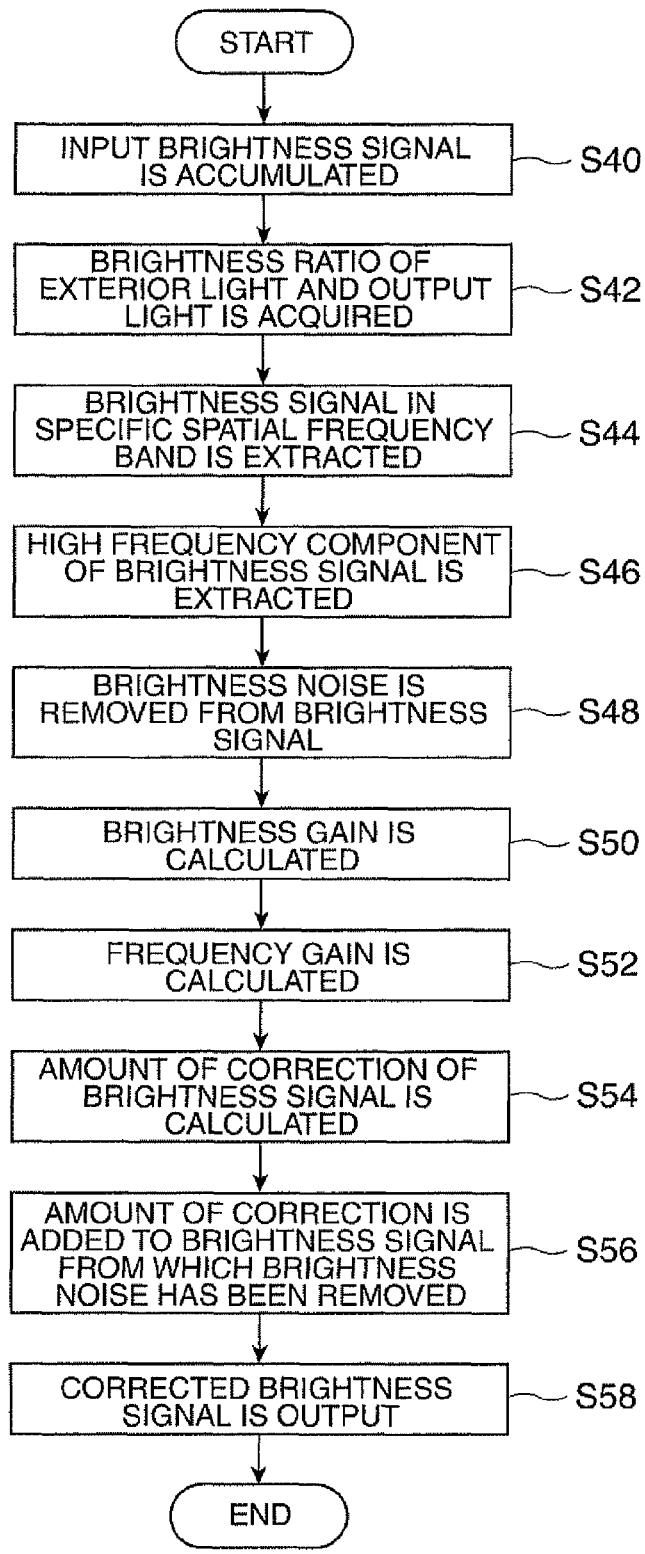
FIG. 29 is a flow chart illustrating an example of correction processing of a luminance signal of the image processing unit in the second embodiment.

FIG. 29 is a flow chart illustrating an example of correction processing of a luminance signal of the image processing unit 400 in the second embodiment. In the case of realizing the processing in FIG. 29 with software, a program for realizing the processing shown in FIG. 29 is stored in the ROM or RAM provided in the image processing unit 400.

First, as an input luminance signal accumulating step (step S40), the image processing unit 400 accumulates a luminance signal (input luminance signal) which forms an input image signal. In this case, the luminance signal is stored in the line memory 32 or the RAM used for realizing the function of the line memory 32.

Then, as a use environment information acquisition step (step S42), the image processing unit 400 acquires the luminance ratio (in a broad sense, the use environment information) calculated on the basis of the luminance of exterior light measured by the sensor 300 and the maximum luminance of output light of the projection unit 100.

Then, as a signal extracting step (step S44), the image processing unit 400 extracts a luminance signal in a specific spatial frequency band from the luminance signal accumulated in the line memory 32 and the like. For example, the multi-stage filter circuit 40 extracts the luminance signal in the predetermined spatial frequency band. Or when realizing the above by software processing, the CPU controls the multiplier or the adder used for realizing the function of the multi-stage filter circuit 40 to thereby extract the luminance signal in the spatial frequency band.

Then, as a frequency analysis step (steps S46 and S48), the image processing unit 400 analyzes the spatial frequency of the luminance signal in the specific spatial frequency band extracted in step S44. More specifically, in step S46, a luminance signal with a predetermined high frequency component in the specific spatial frequency band extracted in step S44 is extracted as a high frequency component extracting step. Then, in step S48, the luminance noise component is removed from the luminance signals accumulated in the line memory 32 and the like as a luminance noise removing step.

Then, as a luminance component correction amount calculating step (steps S50, S52, and S54), the image processing unit 400 calculates the amount of correction of the luminance signal. More specifically, in step S50, the luminance signal extracted in step S44 is weighted and multiplied by the coefficient corresponding to the luminance level of the luminance signal which forms the input image signal, as a luminance gain calculating step. Then, in step S52, the luminance signal multiplied by the coefficient corresponding to the luminance level in step S50 is multiplied by the coefficient corresponding to the luminance signal (output highY of the HPF circuit 73) with the high frequency component extracted in step S46, as a frequency gain calculating step. As a result, in step S56, the correction signal VA corresponding to the amount of correction of the luminance signal is generated. Or when realizing the above by software processing, the CPU performs weighting for the luminance signal extracted by the signal extracting processing and then generates the multiplication result, which is obtained by using the coefficient corresponding to the luminance level of the luminance signal which forms the input image signal and the coefficient corresponding to the luminance signal (output highY of the HPF circuit 73) with the high frequency component extracted in step S46, as the correction signal VA corresponding to the amount of correction of the luminance signal. Thus, in step S54, the amount of correction of the luminance component is calculated on the basis of the signal in the spatial frequency band extracted in step S46, the luminance gain calculated in step S50, and the frequency gain calculated in step S52.

Then, as a luminance component correcting step (step S56), the image processing unit 400 corrects the luminance signal, from which the luminance noise has been removed in step S48, using the amount of correction calculated in step S54 and outputs the corrected luminance signal (step S58), completing the series of the process (End). That is, in step S56, the luminance signal correcting circuit 60 generates the corrected luminance signal by adding the correction signal VA to the luminance signal from which the luminance noise has been removed in step S48. Or when realizing the above by software processing, the CPU generates the corrected luminance signal by adding the correction signal VA to the luminance signal from which the luminance noise has been removed in step S48.

Moreover, in the second embodiment, the order of steps S46 and S48 in FIG. 29 may be exchanged or the order of steps S50 and S52 in FIG. 29 may be exchanged, and the order is not limited to the processing order shown in FIG. 29.

The image processing unit 400 in the second embodiment can perform the correction processing on a color difference signal in the same manner as in the first embodiment. Since the correction processing on the color difference signal using the image processing unit 400 is the same as that in the first embodiment, the illustration and explanation will be omitted.

That is, also in the second embodiment, by controlling the projection unit 100 as an image display step after performing the gray level correction processing so that an image is displayed on the basis of the image signal corrected in the gray level correction processing, it is possible to provide an image display method capable of improving the expression of the detail of the image without affecting the other luminance regions.

As described above, also in the second embodiment, not only is the luminance signal corrected, but also the color difference signal is corrected simultaneously with the luminance signal. In this case, the luminance signal is corrected according to the environment of use of the projector 20, and the object to be corrected is limited to only a luminance signal in a predetermined luminance level range in a predetermined spatial frequency band.

First Modification of the Second Embodiment

Although the ratio of the outputs FO1 to FO3 of the first to third filter circuits 42, 44, and 46 which form the multi-stage filter circuit 40 cannot be changed in the second embodiment, the invention is not limited thereto. In a first modification of the second embodiment, the ratio of the outputs FO1 to FO3 of the first to third filter circuits 42, 44, and 46 which form the multi-stage filter circuit 40 may be changed according to the output highY of the HPF circuit 73.

An image processing unit in the first modification of the second embodiment is different from the image processing unit 400 in the second embodiment in a point of the configuration of a luminance signal correction amount calculating circuit. Accordingly, illustration and explanation on the same point as in the second embodiment will be omitted, and the luminance signal correction amount calculating circuit of the image processing unit in the first modification of the second embodiment will be described.

Figures 30, 31:
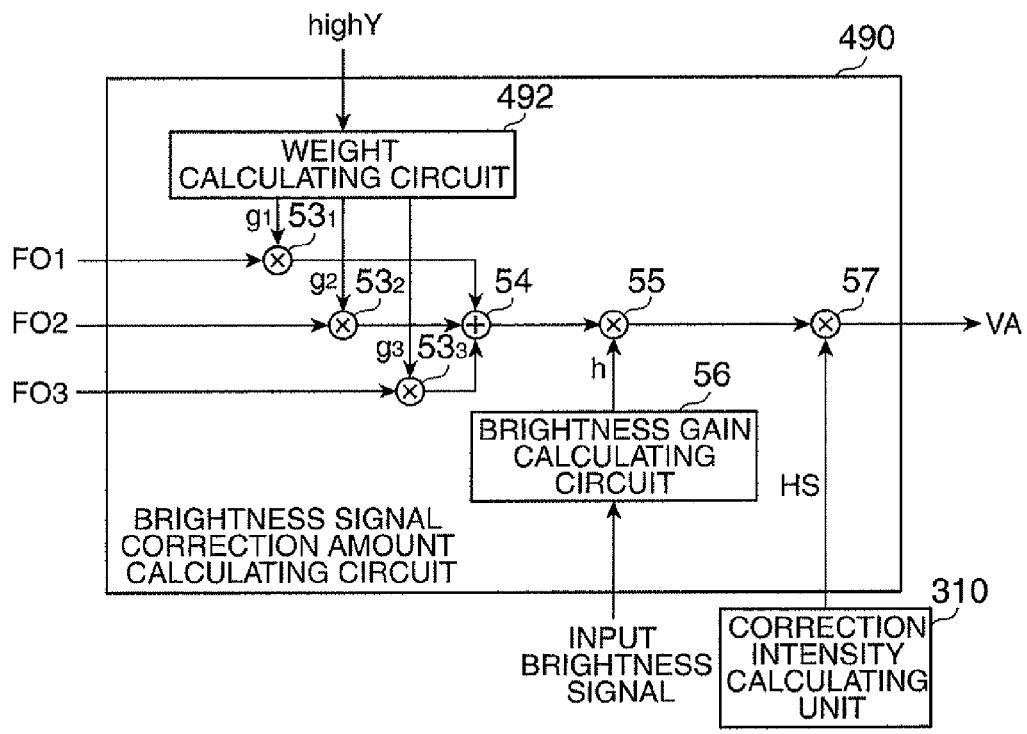
FIG. 30 is a block diagram illustrating an example of the configuration of a luminance signal correction amount calculating circuit in a first modification of the second embodiment.
FIG. 31 is a view for explaining an operation of a weight calculating circuit in FIG. 30.

FIG. 30 is a block diagram illustrating an example of the configuration of the luminance signal correction amount calculating circuit in the first modification of the second embodiment. In FIG. 30, the same sections as in FIG. 27 are denoted by the same reference numerals, and the explanation will be appropriately omitted. In FIG. 30, the correction intensity calculating unit 310 provided outside the image processing unit is shown together.

FIG. 31 is a view for explaining an operation of a weight calculating circuit in FIG. 30.

A luminance signal correction amount calculating circuit 490 in the first modification of the second embodiment includes a weight calculating circuit 492, multipliers $53_1$ to $53_3$, an adder 54, multipliers 55 and 57, and a luminance gain calculating circuit 56.

The output highY generated by the HPF circuit 73 of the high frequency component extracting circuit 72 of the frequency analysis circuit 70 is input to the weight calculating circuit 492. In addition, the weight calculating circuit 492 calculates the weight coefficients $g_1$ to $g_3$ according to the output highY from the HPF circuit 73, as shown in FIG. 31.

Such a weight calculating circuit 492 is realized by the LUT which has the output highY from the HPF circuit 73 as the input and has the weight coefficients $g_1$ to $g_3$ as the output. For this reason, weight coefficients ($g_1$a, $g_2$a, $g_3$a), ($g_1$b, $g_2$b, $g_3$b), ($g_1$c, $g_2$c, $g_3$c), ... which correspond to the output highY from the HPF circuit 73 are stored beforehand in the weight calculating circuit 492, such that the weight coefficient corresponding to the output highY is output when the output highY from the HPF circuit 73 is input.

The adder 54 adds the multiplication results of the multipliers $53_1$ to $53_3$ and outputs the addition result to the multiplier 55. The luminance gain coefficient h calculated by the luminance gain calculating circuit 56 is input to the multiplier 55. The multiplication result of the multiplier 55 is input to the multiplier 57. The correction intensity HS calculated by the correction intensity calculating unit 310 is input to the multiplier 57, similar to FIG. 27. The multiplier 57 outputs the correction signal VA corresponding to the amount of correction of the luminance signal by multiplying the multiplication result of the multiplier 55 by the correction intensity HS. The correction signal VA is input to the luminance signal correcting circuit 60.

Thus, the luminance signal correction amount calculating circuit 490 can calculate the amount of correction of the luminance signal on the basis of the output highY from the HPF circuit 73, the signal in the predetermined spatial frequency band extracted by the multi-stage filter circuit 40 (in a broad sense, a signal extracting circuit), the luminance gain coefficient, and the correction intensity HS from the correction intensity calculating unit 310 corresponding to the environment of use of the projector 20. In addition, the luminance signal correcting circuit 60 outputs the corrected luminance signal Y1 by adding the correction signal VA from the luminance signal correction amount calculating circuit 490 to the luminance signal which forms the input image signal or the luminance signal from which the luminance noise component has been removed, for example.

Figure 32:
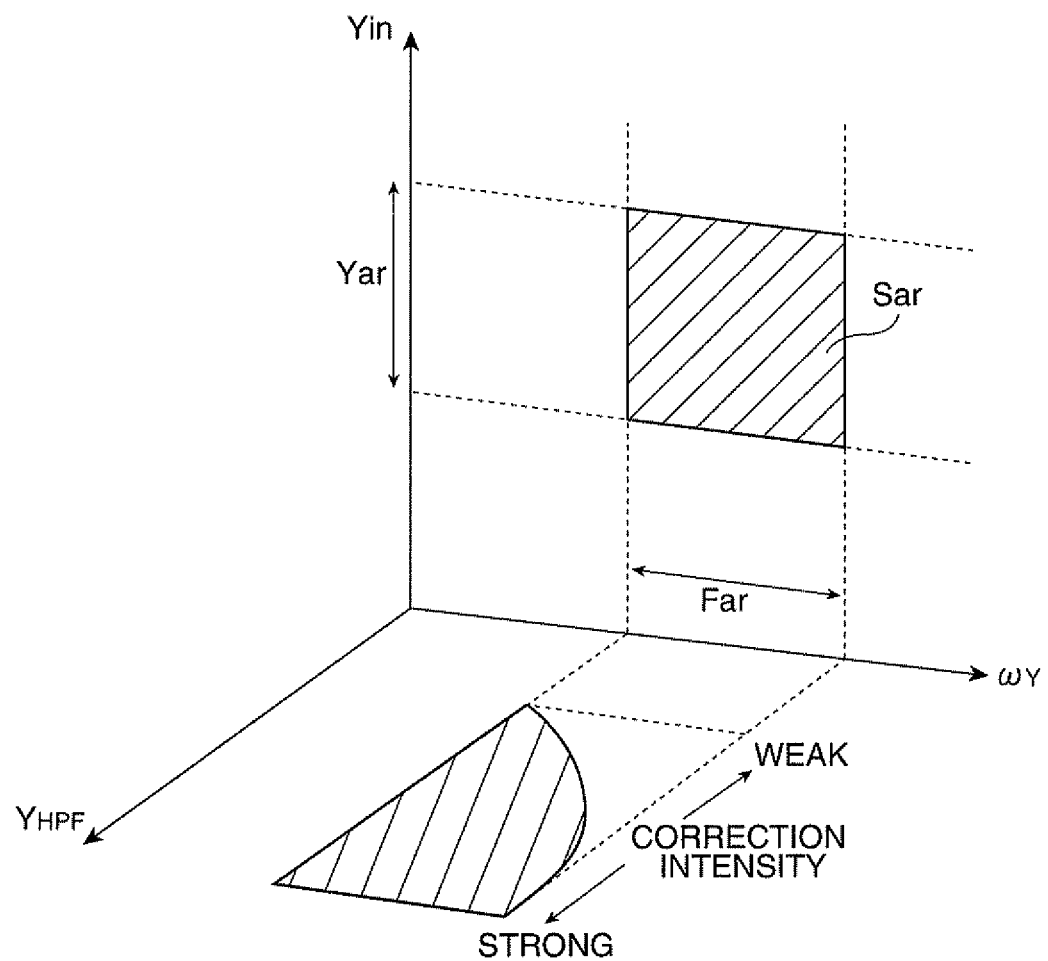
FIG. 32 is a view for explaining an operation of the image processing unit in the first modification of the second embodiment.

FIG. 32 is a view for explaining an operation of the image processing unit in the first modification of the second embodiment. In FIG. 32, the same sections as in FIG. 21 are denoted by the same reference numerals, and the explanation will be appropriately omitted.

In the first modification of the second embodiment, similar to the second embodiment, a spatial frequency of a luminance component of an image signal is analyzed, the amount of correction of the luminance component of the image signal only in a spatial frequency band Far (predetermined spatial frequency band) is calculated according to the luminance ratio (or the correction intensity) corresponding to the environment of use of the projector and the analysis result of the spatial frequency of the luminance component of the image signal, and the luminance component of the image signal is corrected by using the amount of correction. In this case, the degree of gray level correction is made to change according to a high frequency component of the luminance component of the input image signal. In addition, in the first modification of the second embodiment, the ratio of the outputs FO1 to FO3 of the first to third filter circuits 42, 44, and 46 which form the multi-stage filter circuit 40 can be changed. Accordingly, as shown in FIG. 32, the luminance signal can be extracted such that the spatial frequency band becomes narrow as the level of the high frequency component becomes small and the luminance noise accordingly increases. In addition, only the detail of a dark portion can be amplified by applying the luminance gain such that the gain increases at the low luminance.

Thus, according to the first modification of the second embodiment, the spatial frequency band extracted corresponding to the amount of luminance noise can be made narrow in addition to the effects of the second embodiment. As a result, it is possible to prevent luminance noise existing in the high frequency band from being amplified.

Second Modification of the Second Embodiment

In the image processing unit in the second embodiment or the first modification of the second embodiment, the luminance signal correction amount calculating circuit is configured to include the weight coefficient storage circuit 452 or the weight calculating circuit 492 and the luminance gain calculating circuit 56 and to generate the correction signal VA by the multiplier which performs multiplication of the weight coefficient or the luminance gain coefficient. However, the invention is not limited to the configuration.

Figure 33:
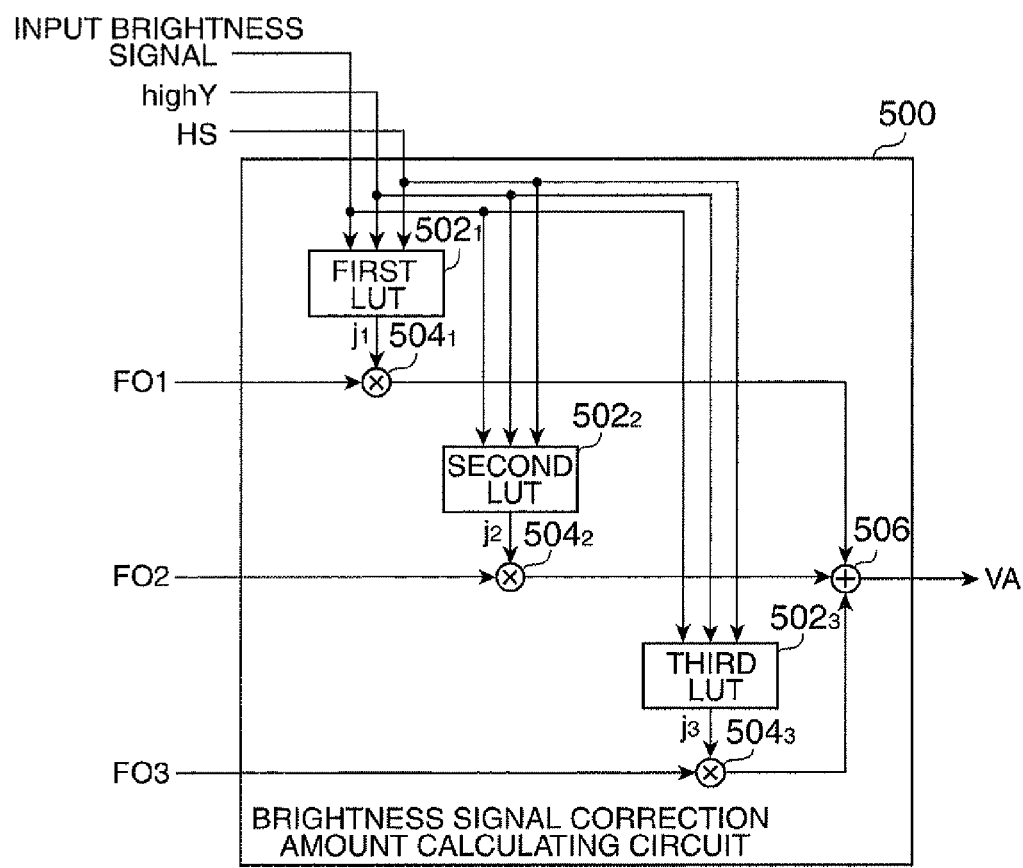
FIG. 33 is a block diagram illustrating an example of the configuration of a luminance signal correction amount calculating circuit in a second modification of the second embodiment.

FIG. 33 is a block diagram illustrating an example of the configuration of the luminance signal correction amount calculating circuit in a second modification of the second embodiment. For example, instead of the luminance signal correction amount calculating circuit 450 in the second embodiment, the luminance signal correction amount calculating circuit shown in FIG. 33 is provided in the image processing unit 400 in FIG. 22.

A luminance signal correction amount calculating circuit 500 includes first to third LUTs $502_1$ to $502_3$, multipliers $504_1$ to $504_3$, and an adder 506. A luminance signal which forms an input image signal and the output highY from the HPF circuit 73 are input to each of the first to third LUTs $502_1$ to $502_3$. In each LUT, the luminance gain coefficient is stored so as to correspond to the combination of the correction intensity HS corresponding to the environment of use of the projector, the luminance signal which forms the input image signal, and the output highY from the HPF circuit 73. The luminance signal correction amount calculating circuit 500 multiplies each output of the multi-stage filter circuit 40 by the luminance gain coefficient from each of the first to third LUTs $502_1$ to $502_3$ and then adds the multiplication results and outputs it as the correction signal VA.

FIGS. 34A to 34C are views for explaining operations of the first to third LUTs $502_1$ to $502_3$ in FIG. 33.

As shown in FIG. 34A, a luminance signal which forms an input image signal, the output highY from the HPF circuit 73, and the correction intensity HS are input to the first LUT $502_1$, and a luminance gain coefficient $j_1$ corresponding to the combination of the luminance signal, the output highY, and the correction intensity HS is output from the first LUT $502_1$. For this reason, luminance gain coefficients $j_1a$, $j_1b$, $j_1c$, . . . corresponding to the combination of the luminance signal, the output highY, and the correction intensity HS are stored beforehand in the first LUT $502_1$, such that the luminance gain coefficient corresponding to the combination of the luminance signal, the output highY from the HPF circuit 73, and the correction intensity HS is output as the luminance gain coefficient $j_1$ when the luminance signal, the output highY, and the correction intensity HS are input.

As shown in FIG. 34B, a luminance signal which forms an input image signal, the output highY from the HPF circuit 73, and the correction intensity HS are input to the second LUT $502_2$, and a luminance gain coefficient $j_2$ corresponding to the combination of the luminance signal, the output highY, and the correction intensity HS luminance gain coefficients $j_2a$, $j_2b$, $j_2c$, . . . corresponding to the combination of the luminance signal, the output highY, and the correction intensity HS are stored beforehand in the second LUT $502_2$, such that the luminance gain coefficient corresponding to the combination of the luminance signal, the output highY from the HPF circuit 73, and the correction intensity HS is output as the luminance gain coefficient $j_2$ when the luminance signal, the output highY, and the correction intensity HS are input.

As shown in FIG. 34C, a luminance signal which forms an input image signal, the output highY from the HPF circuit 73, and the correction intensity HS are input to the third LUT $502_3$, and a luminance gain coefficient $j_3$ corresponding to the combination of the luminance signal, the output highY, and the correction intensity HS is output from the third LUT $502_3$. For this reason, luminance gain coefficients $j_3a$, $j_3b$, $j_3c$, . . . corresponding to the combination of the luminance signal, the output highY, and the correction intensity HS are stored beforehand in the third LUT $502_3$, such that the luminance gain coefficient corresponding to the combination of the luminance signal, the output highY from the HPF circuit 73, and the correction intensity HS is output as the luminance gain coefficient $j_3$ when the luminance signal, the output highY, and the correction intensity HS are input.

In FIG. 33, the multiplier $504_1$ performs multiplication of an output FO1 of the first filter circuit 42, which forms the multi-stage filter circuit 40, and the luminance gain coefficient $j_1$ from the first LUT $502_1$ and outputs the multiplication result to the adder 506. The multiplier $504_2$ performs multiplication of an output FO2 of the second filter circuit 44, which forms the multi-stage filter circuit 40, and the luminance gain coefficient $j_2$ from the second LUT $502_2$ and outputs the multiplication result to the adder 506. The multiplier $504_3$ performs multiplication of an output FO3 of the third filter circuit 46, which forms the multi-stage filter circuit 40, and the luminance gain coefficient $j_3$ from the third LUT $502_3$ and outputs the multiplication result to the adder 506.

The adder 506 adds the multiplication results of the multipliers $504_1$ to $504_3$ and outputs the addition result as the correction signal VA.

As described above, the image processing unit in the second modification of the second embodiment includes the multi-stage filter circuit 40 which extracts a signal in a predetermined spatial frequency band from the luminance component of an image signal. The luminance signal correction amount calculating circuit 500 includes: a plurality of tables which is provided for every output of the multi-stage filter circuit 40 and outputs a gain corresponding to the level of a luminance component before correction; a plurality of multipliers which is provided for every output of the multi-stage filter circuit 40 and performs multiplication of the output of the multi-stage filter circuit 40 and the output of each of the plurality of tables; and an adder which adds the multiplication results of the plurality of multipliers. The luminance signal correction amount calculating circuit 500 can calculate the output of the adder as the amount of correction of the luminance component.

Also in the second modification of the second embodiment, not only can the luminance signal be corrected, but also the color difference signal can be corrected simultaneously with the luminance signal, similar to the second embodiment or the first modification of the second embodiment.

According to the second modification of the second embodiment, the number of multipliers provided in the luminance signal correction amount calculating circuit can be reduced compared with that in the second embodiment or the first modification of the second embodiment. As a result, it becomes possible to reduce power consumption and cost.

Third Modification of the Second Embodiment

The luminance signal correction amount calculating circuit 500 in the second modification of the second embodiment is configured to include the first to third LUTs $502_1$ to $502_3$, the multipliers $504_1$ to $504_3$, and the adder 506 and to add the multiplication results of the multipliers using the luminance gain coefficients from the first to third LUTs $502_1$ to $502_3$, as shown in FIG. 33. However, the invention is not limited to the configuration.

Figure 35:
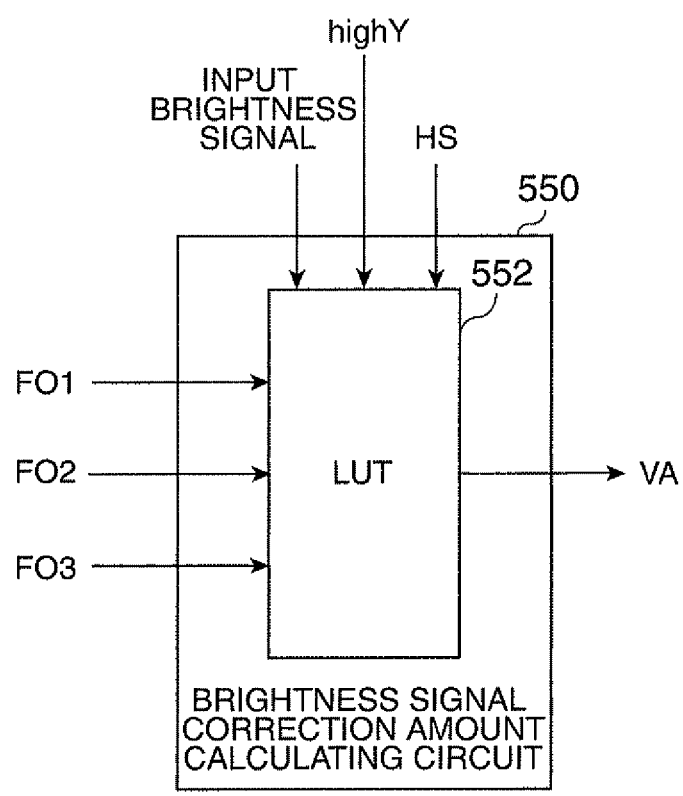
FIG. 35 is a block diagram illustrating an example of the configuration of a luminance signal correction amount calculating circuit in a third modification of the second embodiment.

FIG. 35 is a block diagram illustrating an example of the configuration of a luminance signal correction amount calculating circuit in a third modification of the second embodiment. For example, instead of the luminance signal correction amount calculating circuit 50 in the second embodiment, the luminance signal correction amount calculating circuit shown in FIG. 35 is provided in the image processing unit 400 in FIG. 22.

The luminance signal correction amount calculating circuit 550 includes a LUT 552. The luminance signal correction amount calculating circuit 550 outputs the output from the LUT 552 as a correction signal VA.

FIG. 36 is a view for explaining an operation of the LUT 552 in FIG. 35.

A luminance signal which forms an input image signal, the output highY from the HPF circuit 73, outputs FO1 to FO3 of first to third filter circuits 42 to 44 which form the multi-stage filter circuit 40, and the correction intensity HS are input to the LUT 552, and the amount of correction corresponding to the combination of the luminance signal, the output highY, the outputs of the filter circuits, and the correction intensity HS is output from the LUT 552. This amount of correction is output as the correction signal VA. For this reason, the amounts of correction (correction signal) VAa, VAb, ..., VAc, VAd, ..., VAe, VAf, ... corresponding to the combination of the luminance signal, the output highY, the outputs FO1 to FO3 of the filter circuits, and the correction intensity HS are stored beforehand in the LOT 552, such that the amount of correction corresponding to the combination is output when the luminance signal, the output highY, the outputs of the filter circuits, and the correction intensity HS are input.

Also in the third modification of the second corrected, but also the color difference signal can be corrected simultaneously with the luminance signal, similar to the second embodiment or the modifications of the second embodiment.

According to the third modification of the second embodiment, the multipliers and the adder provided in the luminance signal correction amount calculating circuit can be removed compared with the second embodiment or the modifications of the second embodiment. As a result, it becomes possible to significantly reduce power consumption and cost.

Third Embodiment

In the first embodiment or the modifications of the first embodiment, the gray level correction processing was performed on the input luminance signal. However, the invention is not limited to this. In a third embodiment of the invention, gray level correction processing is performed on an input chroma signal. Specifically, the projector 20 includes an image processing unit 30A which performs gray level correction processing on an input chroma signal instead of the image processing unit 30 which performs gray level correction processing on the input luminance signal.

Moreover, in the following explanation, different components from those in the first embodiment will be mainly described, and explanations on the components which are common with the first embodiment will be appropriately omitted.

Figure 37:
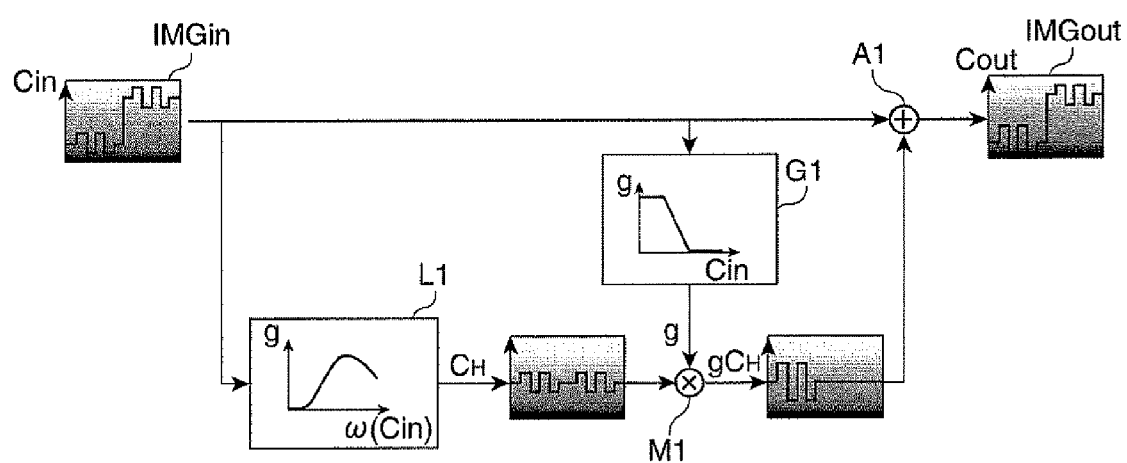
FIG. 37 is an explanatory view illustrating the gray level correction processing performed in an image processing unit.

FIG. 37 is an explanatory view illustrating the gray level correction processing performed in the image processing unit 30A. FIG. 37 schematically shows the characteristics of an image expressed by each image signal under the gray level correction processing, where the horizontal axis indicates the horizontal position of the image and the vertical axis indicates the chroma level.

An input image IMGin is, for example, an image with low chrome at the left side and high chrome at the right side. In the input image IMGin, there is a small gray level change both in a region where the chrome is low and a region where the chroma is high. A signal extracting unit L1 extracts a signal $C_H$ of a chrome component in a predetermined spatial frequency band from the chroma components of the image signal of the input image IMGin. In FIG. 37, the gain is set corresponding to the spatial frequency, and the signal extracting unit L1 extracts the signal $C_H$ of the chroma component in the spatial frequency band where this gain is large.

In addition, a chrome gain calculating unit G1 calculates a gain coefficient g (chroma gain coefficient. In a broad sense, a chrome gain; the same hereinbelow) corresponding to the level of the chrome component of the image signal of the input image. In FIG. 37, the chroma gain calculating unit G1 calculates the gain coefficient g such that it increases in a region where the level of the chrome component is low and it becomes almost 0 in a region where the level of the chroma component is high.

As a result, a multiplier M1 generates a signal $gC_H$ by multiplying the signal $C_H$ extracted by the signal extracting unit L1 by the gain coefficient g calculated by the chroma gain calculating unit G1. The signal $gC_H$ is a signal corresponding to the amount of correction of a chrome component of an input image signal. An adder A1 adds a chrome signal Cin of the input image signal and the signal $gC_H$ and outputs a chrome signal Cout which forms an image signal after gray level correction.

Moreover, in the third embodiment, in one processing shown in FIG. 37, highlight processing of the detail is varied with the correction intensity corresponding to the environment of use of the projector 20.

Figure 38:
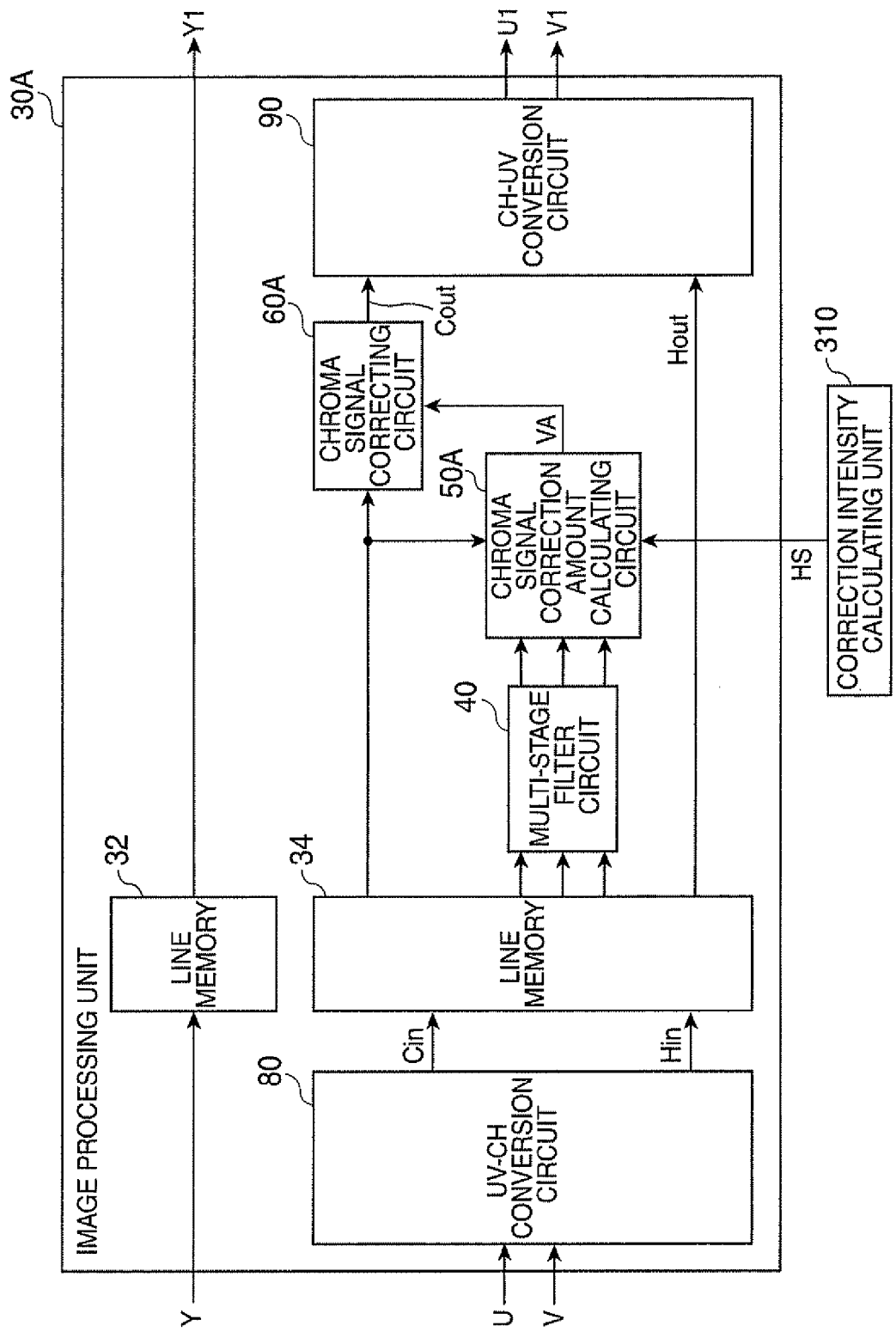
FIG. 38 is a block diagram illustrating an example of the hardware configuration of the image processing unit.

FIG. 38 is a block diagram illustrating an example of the hardware configuration of the image processing unit 30A. In FIG. 38, the correction intensity calculating unit 310 provided outside the image processing unit 30A is shown together.

The image processing unit 30A includes line memories 32 and 34, a multi-stage filter circuit (signal extracting circuit) 40, a chroma signal correction amount calculating circuit (chroma component correction amount calculating section) 50A, a chroma signal correcting circuit (chroma component correcting section) 60A, a UV-CH conversion circuit (in a broad sense, a conversion circuit) 80, and a CH-UV conversion circuit 90.

The line memory 32 stores a luminance signal Y (luminance component of an input image signal) which forms an input image signal. The luminance signal Y stored in the line memory 32 is output as a luminance signal Y1 as it is.

In addition, a chroma signal Cin and a hue signal Hin corresponding to color difference signals U and V (color difference components of the input image signal), which correspond to the luminance signal, are stored in the line memory 34 in synchronization with a timing at which the luminance signal Y is stored in the line memory 32. The chroma signal Cin and the hue signal Hin can be acquired by converting the color difference signals U and V by the UV-CH conversion circuit 80.

The UV-CH conversion circuit 80 converts the color difference signals U and V into the chroma signal Cin and the hue signal Hin, for example, according to the following expression and stores them in the line memory 34. The line memory 34 stores the chroma signal Cin corresponding to the number of lines required in the multi-stage filter circuit 40.

$$Cin = \sqrt{U^2 + V^2} \qquad (6)$$
$$Hin = \begin{cases} \arctan(V/U) & U \geq 0 \\ \arctan(V/U) + \pi & U < 0 \end{cases}$$

The hue signal Hin stored in the line memory 34 is output as a hue signal Hout as it is. On the other hand, the chroma signal Cin stored in the line memory 34 is provided for detail highlight processing similar to the luminance signal Yin in the first embodiment.

The multi-stage filter circuit 40 extracts a signal in a predetermined spatial frequency band from the chroma signal Cin (chroma component of the image signal) stored in the line memory 34. The multi-stage filter circuit 40 can realize a function of the signal extracting unit L1 in FIG. 37.

The chroma signal correction amount calculating circuit 50A calculates the amount of correction of the chroma signal on the basis of the output of the multi-stage filter circuit 40, the chroma signal stored in the line memory 34, and the correction intensity HS from the correction intensity calculating unit 310. According to the correction intensity HS from the correction intensity calculating unit 310, the chroma signal correction amount calculating circuit 50A can calculate the amount of correction for the chrome signal in a predetermined chroma level range among the chroma signals in the predetermined spatial frequency band extracted by the multi-stage filter circuit 40. The chroma signal correction amount calculating circuit 50A can realize a function of the chrome gain calculating unit G1 in FIG. 37.

The chrome signal correcting circuit 60A corrects the chrome signal stored in the line memory 34 using the amount of correction calculated by the chrome signal correction amount calculating circuit 50A and outputs it as a corrected chrome signal Cout.

The CH-UV conversion circuit 90 converts the chrome signal Cout from the chroma signal correcting circuit 60A and the hue signal Hout from the line memory into color difference signals U1 and V1. The CH-UV conversion circuit 90 converts the chroma signal Cout and the hue signal Hout into the color difference signals U1 and V1 according to the following expression, for example.

$$U1 = Cout \cdot \cos(Hout)$$

$$V1 = Cout \cdot \sin(Hout) \quad (7)$$

In this way, the image processing unit 30A outputs to the projection unit 100 image signals of the luminance signal Y1 and the color difference signals U1 and V1, which have been converted from the hue signal Hout and the chrome signal Cout having been subjected to the detail highlight processing.

Thus, the image processing unit 30A can correct a chroma signal according to the environment of use of the projector 20 only for chroma signals with predetermined chroma level in a predetermined spatial frequency band. In this case, the image processing unit 30A includes the UV-CH conversion circuit 80, converts a color difference signal (color difference component) which forms an input image signal into the chrome signal Cin and the hue signal Hin corresponding to the color difference signal, and performs the detail highlight processing on the chroma signal Cin. As a result, even in the case where a high chroma portion and a low chroma portion are mixed, details of the portions can be expressed without changing the hue.

Fourth Embodiment

In the third embodiment, the gray level correction processing was performed on the input chroma signal without distinguishing the detail of an image from chroma noise. However, the invention is not limited to this. In a fourth embodiment of the invention, the correction intensity of the gray level is changed according to a high frequency component of a chroma component of an input image signal, such that the gray level correction processing on the input chroma signal is performed in a state where the detail of an image and chroma noise are distinguished from each other. Moreover, in the following explanation, different components from those in the third embodiment will be mainly described, and explanations on the components which are common with the third embodiment will be appropriately omitted.

An image processing unit 400A in the fourth embodiment is provided in the projector 20, which includes the sensor 300 and the correction intensity calculating unit 310, instead of the image processing unit 30A in FIG. 38. When performing the same gray level correction processing as in the third embodiment as shown in FIG. 37, the image processing unit 400 calculates a gain coefficient f (frequency gain coefficient. In a broad sense, a frequency gain; the same hereinbelow) by a frequency gain calculating unit (not shown) in consideration of the amount of chroma noise included in the chroma component of the image signal of the input image IMGin and multiplies the gain coefficient f by the signal $gC_H$ to distinguish the detail of a low chroma portion from the chroma noise, so that only the detail of the low chroma portion of the display image is highlighted.

Figure 39:
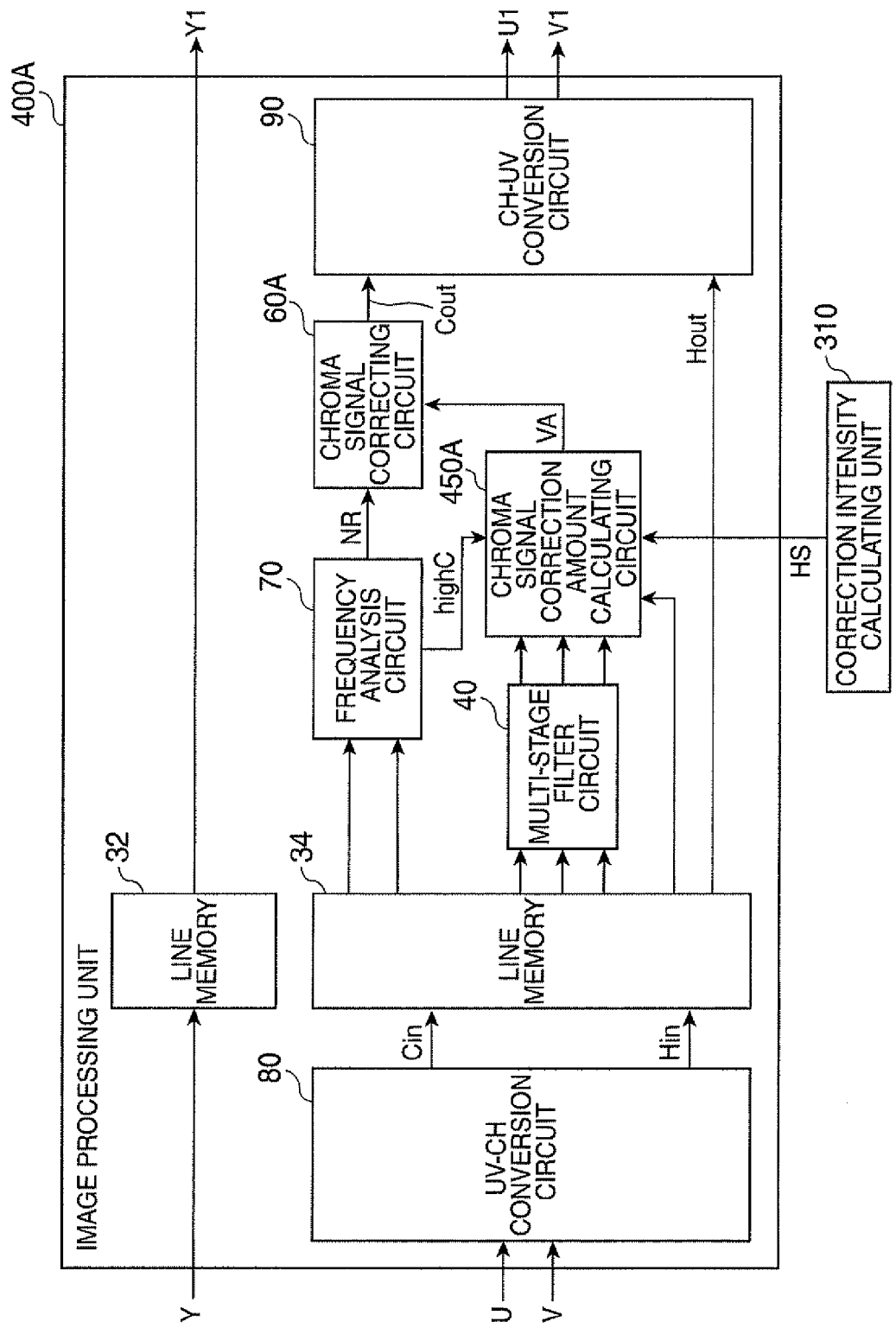
FIG. 39 is a block diagram illustrating an example of the hardware configuration of an image processing unit in a fourth embodiment.

FIG. 39 is a block diagram illustrating an example of the hardware configuration of the image processing unit 400A. In FIG. 39, the correction intensity calculating unit 310 provided outside the image processing unit 400A is shown together.

The image processing unit 400A has the same function as the image processing unit 400 in the second embodiment. However, the image processing unit 400A in the fourth embodiment is different from the image processing unit 400 in the second embodiment in that the image processing unit 400A performs gray level correction processing on an input chrome signal, while the image processing unit 400 performs gray level correction processing on an input luminance signal.

The image processing unit 400A in the fourth embodiment analyzes a spatial frequency of a chrome component of an image signal, calculates the amount of correction of the chroma component of the image signal according to the analysis result of the spatial frequency of the chrome component of the image signal and the luminance ratio (or the correction intensity), which corresponds to the environment of use of the projector, only in a spatial frequency band Far (predetermined spatial frequency band), and corrects the chrome component of the image signal using the amount of correction. More specifically, the image processing unit 400A performs the gray level correction of a signal in a predetermined level range Car of the chrome signal Cin of the input image signal, which has been calculated by the chrome gain calculating unit G1, in the spatial frequency band Far of the chrome component of the image signal extracted by the signal extracting unit L1. In this case, the correction intensity of the gray level is changed according to a high frequency component of a chrome component of an input image signal and the luminance ratio (or the correction intensity) corresponding to the environment of use of the projector. For example, assuming that a projector is used under the same environment, when there are many high frequency components in the chrome component, it is determined that there are many desired signal components and there is little chroma noise, the degree of correction is intensified. In addition, when there are few high frequency components in the chroma component, it is determined that there are few desired signal components and there is significant chroma noise, the degree of correction is weakened. As a result, the chroma component can be changed only in the spatial frequency band Far extracted by the signal extracting unit L1 and the predetermined level range Car of the chroma signal Cin which forms the input image signal calculated by the chroma gain calculating unit G1 without highlighting the chroma noise of the image and changing the tendency of the overall chroma.

Having described the image processor, the image display device, and the image processing method of the invention on the basis of the above embodiments, the invention is not limited to the above-described embodiments, and various modifications thereof may be made within the scope without departing from the subject matter or spirit of the invention. For example, the following modifications may also be made.

(1) In each of the embodiments and the modifications described above, the projector was used as an example of the image display device. However, the invention is not limited thereto. The image display device of the invention may also be applied to all kinds of devices which perform image display, such as a liquid crystal display device, a plasma display device, and an organic EL display device.

(2) In each of the embodiments and the modifications described above, the light valve using a transmissive liquid crystal panel was used as a light modulating device. However, the invention is not limited thereto. For example, a DLP (digital light processing; registered trademark), a LCOS (liquid crystal on silicon), and the like may be adopted as light modulating devices.

(3) In each of the embodiments and the modifications described above, the light valve using a so-called three plate type transmissive liquid crystal panel was used as an example of the light modulating device. However, a light valve using a single plate type liquid crystal panel or a two or four or more plate type transmissive liquid crystal panel may also be adopted.

(4) In each of the embodiments and the modifications described above, one pixel was formed by sub-pixels of three color components. However, the invention is not limited thereto. The number of color components which form one pixel may be 2 or 4 or more.

(5) In each of the embodiments and the modifications described above, the luminance gain and the frequency gain are calculated. However, the invention is not limited thereto. That is, when correcting an input luminance signal, it may be possible to calculate at least one of the luminance gain and the frequency gain and to correct the input luminance signal using the calculation result.

(6) In each of the embodiments and the modifications described above, the invention was described as the image processor, the image display device, and the image processing method. However, the invention is not limited thereto. For example, the invention may be an image display system including the image processor or the image display device. Moreover, for example, the invention may be a program, in which the procedure of the processing method (image processing method) of an image processor for realizing the invention or the procedure of the processing method (image display method) of an image display device for realizing the invention is described, or a recording medium recorded with the program.

The entire disclosure of Japanese Patent Application NOs. 2008-332969, filed Dec. 26, 2008 and 2009-013871, filed Jan. 26, 2009 are expressly incorporated by reference herein.

What is claimed is:

1. An image processor that corrects an image signal supplied to an image display section, comprising:
    a luminance component correction amount calculating section that calculates an amount of correction of a luminance component of the image signal according to a visual environment for an image signal only in a predetermined luminance level range less than a luminance level range of an entire image and in a predetermined spatial frequency band;
    a luminance component correcting section that corrects the luminance component of the image signal using the amount of correction calculated by the luminance component amount calculating section;
    a frequency analysis section configured to analyze a spatial frequency of the luminance component of the image signal,
    wherein the luminance component correction amount calculating section calculates the amount of correction using a luminance ratio of outside light and output light of the image display section as the visual environment, the luminance component correction amount calculating section calculating the amount of the correction of the luminance component of the image signal based on the luminance ratio and an analysis result of the frequency analysis section;
    a color difference component correcting section that corrects a color difference component of the image signal such that a value of xy chromaticity does not change before and after correction using the luminance component correcting section;
    a color difference component correction amount calculating section which calculates the amount of correction of the color difference component of the image signal such that the value of xy chromaticity does not change, on the basis of luminance components of the image signal before and after correction using the luminance component correcting section,
    wherein the color difference component correcting section corrects the color difference component of the image signal using the amount of correction of the color difference component calculated by the color difference component correction amount calculating section; and
    an adjustment parameter storage section that stores an adjustment parameter of the color difference component,
    wherein assuming that a luminance component before correction is Yin, a luminance component after correction is Yout, and the adjustment parameter is b, the color difference component correcting section corrects the color difference component by multiplying the color difference component of the image signal by a color difference gain of $(1-b\times(-Yout/Yin))$.

2. The image processor according to claim 1, further comprising:
    a signal extracting circuit that extracts a signal in the spatial frequency band from the luminance component of the image signal,
    wherein the luminance component correction amount calculating section includes a luminance gain calculating circuit, which calculates the luminance gain corresponding to a level of the luminance component of the image signal, and calculates the amount of correction of the luminance component on the basis of the signal in the spatial frequency band extracted by the signal extracting circuit, the luminance gain calculated by the luminance gain calculating circuit, and the luminance ratio.

3. The image processor according to claim 1, further comprising:
    a multi-stage filter circuit that extracts a signal in the spatial frequency band from the luminance component of the image signal,
    wherein the luminance component correction amount calculating section includes a plurality of tables which is provided for every output of the multi-stage filter circuit and outputs a gain corresponding to the luminance ratio and the level of the luminance component before correction, a plurality of multipliers which is provided for every output of the multi-stage filter circuit and performs multiplication of the output of the multi-stage filter circuit and the output of each of the plurality of tables, and an adder which adds the multiplication results of the plurality of multipliers, and calculates an output of the adder as the amount of correction of the luminance component.

4. The image processor according to claim 1, further comprising:
a signal extracting circuit that extracts a signal in the spatial frequency band from the luminance component of the image signal,
wherein the luminance component correction amount calculating section includes a table which outputs the amount of correction of the luminance component corresponding to an output of the signal extracting circuit, a level of the luminance component before correction, and the luminance ratio.

5. The image processor according to claim 1,
wherein the frequency analysis section includes a high frequency component extracting section that extracts a predetermined high frequency component of the luminance component of the image signal, and
the luminance component correction amount calculating section includes a frequency gain calculating section, which calculates a frequency gain corresponding to the high frequency component extracted by the high frequency component extracting section, and calculates the amount of correction of the luminance component on the basis of the luminance component in the predetermined luminance level range in the spatial frequency band, the frequency gain calculated by the frequency gain calculating section, and the luminance ratio.

6. The image processor according to claim 5,
wherein the luminance component correction amount calculating section includes a luminance gain calculating section, which calculates a luminance gain corresponding to the level of the luminance component of the image signal, and the amount of correction of the luminance component on the basis of a signal in the spatial frequency band, the frequency gain, the luminance gain calculated by the luminance gain calculating section, and the luminance ratio.

7. The image processor according to claim 1, further comprising:
a signal extracting section that extracts a signal in the spatial frequency band from the luminance component of the image signal.

8. The image processor according to claim 1,
wherein the frequency analysis section includes a luminance noise removing section that removes a predetermined luminance noise component from the luminance component of the image signal, and
the luminance component correcting section corrects a luminance component of the image signal, from which the luminance noise component has been removed by the luminance noise removing section, using the amount of correction.

9. An image display device that displays an image on the basis of an image signal, comprising:
the image processor according to claim 1 that corrects the image signal; and
an image display section that displays an image on the basis of the image signal corrected by the image processor.

10. The image display device according to claim 9, further comprising:
a sensor that measures the luminance of output light of the image display section and the luminance of outside light.

11. An image method of correcting an image signal supplied to an image display section, comprising:
calculating an amount of correction of a luminance component of the image signal according to a visual environment for an image signal only in a predetermined luminance level range less than a luminance level range of an entire image and in a predetermined spatial frequency band, wherein the amount of the correction of the luminance component of the image signal is calculated based on a luminance ratio and an analysis result based on analyzing a spatial frequency of the luminance component of the image signal;
correcting the luminance component of the image signal using the amount of correction calculated in the calculating of the amount of correction of the luminance component;
correcting a color difference component of the image signal by a color difference component correcting section, such that a value of xy chromaticity does not change before and after the correction step;
calculating the amount of correction of the color difference component of the image signal by a color difference component correction amount calculating section, such that the value of xy chromaticity does not change, on the basis of luminance components of the image signal before and after the correction step,
wherein the color difference component correcting section corrects the color difference component of the image signal using the amount of correction of the color difference component calculated by the color difference component correction amount calculating section; and
storing an adjustment parameter of the color difference component by an adjustment parameter storage section,
wherein assuming that a luminance component before correction is Yin, a luminance component after correction is Yout, and the adjustment parameter is b, the color difference component correcting section corrects the color difference component by multiplying the color difference component of the image signal by a color difference gain of $(1-b\times(1-Yout/Yin))$.

12. An image processor that corrects an image signal supplied to an image display section, comprising:
a chroma component correction amount calculating section that calculates an amount of correction of a chroma component of the image signal according to a visual environment for an image signal only in a predetermined chroma level range less than a chroma level range of the entire image and in a predetermined spatial frequency band, wherein the amount of the correction of the chroma component of the image signal is calculated in the predetermined chroma level range among chroma signals in the predetermined spatial frequency band; and
a chroma component correcting section that corrects the chroma component of the image signal using the amount of correction calculated by the chroma component correction amount calculating section; and
a conversion circuit that converts a color difference component, which forms the image signal, into a chroma component and a hue component corresponding to the color difference component,
wherein the chroma component converted by the conversion circuit is corrected.

13. An image display device that displays an image on the basis of an image signal, comprising:
the image processor according to claim 12 that corrects the image signal; and
an image display section that displays an image on the basis of the image signal corrected by the image processor.

14. An image processing method correcting an image signal supplied to an image display section, comprising:

calculating an amount of correction of a chroma component of the image signal according to a visual environment for an image signal only in a predetermined chroma level range less than a chroma level range of an entire image and in a predetermined spatial frequency band, wherein the amount of the correction of the chroma component of the image signal is calculated in the predetermined chroma level range among chroma signals in the predetermined spatial frequency band;

correcting the chroma component of the image signal using the amount of correction calculated in the calculating of the correction of the chroma component if a low chroma portion and a high chroma portion are mixed; and converting a color difference component, which forms the image signal, into a chroma component and a hue component corresponding to the color difference component, wherein the chroma component converted is corrected.

* * * * *